US008081822B1

(12) United States Patent
Bell

(10) Patent No.: US 8,081,822 B1
(45) Date of Patent: Dec. 20, 2011

(54) SYSTEM AND METHOD FOR SENSING A FEATURE OF AN OBJECT IN AN INTERACTIVE VIDEO DISPLAY

(75) Inventor: Matthew T. Bell, Palo Alto, CA (US)

(73) Assignee: Intellectual Ventures Holding 67 LLC, Las Vegas, NV (US)

( * ) Notice: Subject to any disclaimer, the term of this patent is extended or adjusted under 35 U.S.C. 154(b) by 1038 days.

(21) Appl. No.: 11/142,202

(22) Filed: May 31, 2005

(51) Int. Cl.
*G06K 9/00* (2006.01)

(52) U.S. Cl. ........ 382/181; 382/124; 382/106; 345/157; 345/179; 345/180

(58) Field of Classification Search .................. 382/181, 382/103, 240; 345/156–158, 179, 180
See application file for complete search history.

(56) References Cited

U.S. PATENT DOCUMENTS

| | | |
|---|---|---|
| 2,917,980 A | 12/1959 | Grube et al. |
| 3,068,754 A | 12/1962 | Benjamin et al. |
| 3,763,468 A | 10/1973 | Ovshinsky et al. |
| 4,053,208 A | 10/1977 | Kato et al. |
| 4,275,395 A | 6/1981 | Dewey et al. |
| 4,573,191 A | 2/1986 | Kidode et al. |
| 4,725,863 A | 2/1988 | Dumbreck et al. |
| 4,843,568 A | 6/1989 | Krueger et al. |
| 4,887,898 A | 12/1989 | Halliburton et al. |
| 4,948,371 A | 8/1990 | Hall |
| 5,001,558 A | 3/1991 | Burley et al. |
| 5,138,304 A | 8/1992 | Bronson |
| 5,151,718 A | 9/1992 | Nelson |
| 5,239,373 A | 8/1993 | Tang et al. |
| 5,276,609 A | 1/1994 | Durlach |
| 5,319,496 A | 6/1994 | Jewell et al. |
| 5,325,472 A | 6/1994 | Horiuchi et al. |
| 5,325,473 A | 6/1994 | Monroe et al. |
| 5,426,474 A | 6/1995 | Rubstov et al. |
| 5,436,639 A | 7/1995 | Arai et al. |
| 5,442,252 A | 8/1995 | Golz |
| 5,454,043 A * | 9/1995 | Freeman ...................... 382/168 |
| 5,497,269 A | 3/1996 | Gal |

(Continued)

FOREIGN PATENT DOCUMENTS

EP 0055366 A2 7/1982

(Continued)

OTHER PUBLICATIONS

Lantagne et al. "VIP: Vision tool for comparing Images of People" Vision Interface 2003, pp. 1-8.*

(Continued)

*Primary Examiner* — Brian Q Le
*Assistant Examiner* — Mekonen Bekele
(74) *Attorney, Agent, or Firm* — Knobbe Martens Olson & Bear, LLP

(57) ABSTRACT

Embodiments of the present invention include a method for processing captured image information in an interactive video display system. The method includes accessing a region of a vision image. The method further includes comparing the region of the vision image to a first orientation of a value image. The value image comprises a plurality of weighted values representing a feature to be detected. The method further includes comparing the region of the vision image to a second orientation of the value image. The method further includes determining which orientation of the value image best matches the feature to be detected to an object of the region of the vision image.

12 Claims, 11 Drawing Sheets

U.S. PATENT DOCUMENTS

| | | |
|---|---|---|
| 5,510,828 A | 4/1996 | Lutterbach et al. |
| 5,526,182 A | 6/1996 | Jewell et al. |
| 5,528,263 A | 6/1996 | Platzker et al. |
| 5,528,297 A | 6/1996 | Seegert et al. |
| 5,534,917 A | 7/1996 | MacDougall |
| 5,548,694 A | 8/1996 | Gibson |
| 5,591,972 A | 1/1997 | Noble et al. |
| 5,594,469 A | 1/1997 | Freeman et al. |
| 5,633,691 A | 5/1997 | Vogeley et al. |
| 5,703,637 A | 12/1997 | Miyazaki et al. |
| 5,808,784 A | 9/1998 | Ando et al. |
| 5,861,881 A | 1/1999 | Freeman et al. |
| 5,882,204 A | 3/1999 | Iannazo et al. |
| 5,923,380 A | 7/1999 | Yang et al. |
| 5,923,475 A | 7/1999 | Kurtz et al. |
| 5,953,152 A | 9/1999 | Hewlett |
| 5,969,754 A | 10/1999 | Zeman |
| 5,978,136 A | 11/1999 | Ogawa et al. |
| 5,982,352 A | 11/1999 | Pryor |
| 6,008,800 A | 12/1999 | Pryor |
| 6,058,397 A | 5/2000 | Barrus et al. |
| 6,075,895 A | 6/2000 | Qiao et al. |
| 6,084,979 A | 7/2000 | Kanada et al. |
| 6,088,612 A | 7/2000 | Blair |
| 6,097,369 A | 8/2000 | Wambach |
| 6,106,119 A | 8/2000 | Edwards |
| 6,118,888 A | 9/2000 | Chino et al. |
| 6,125,198 A | 9/2000 | Onda |
| 6,166,744 A | 12/2000 | Jaszlics et al. |
| 6,176,782 B1 | 1/2001 | Lyons et al. |
| 6,191,773 B1 | 2/2001 | Maruno et al. |
| 6,198,487 B1 | 3/2001 | Fortenbery et al. |
| 6,198,844 B1 | 3/2001 | Nomura |
| 6,263,339 B1 | 7/2001 | Hirsch |
| 6,292,171 B1 | 9/2001 | Fu et al. |
| 6,308,565 B1 | 10/2001 | French et al. |
| 6,323,895 B1 | 11/2001 | Sata |
| 6,333,735 B1 | 12/2001 | Anvekar |
| 6,335,977 B1 | 1/2002 | Kage |
| 6,339,748 B1 | 1/2002 | Hiramatsu |
| 6,349,301 B1 | 2/2002 | Mitchell et al. |
| 6,353,428 B1 | 3/2002 | Maggioni et al. |
| 6,359,612 B1 | 3/2002 | Peter et al. |
| 6,388,657 B1 | 5/2002 | Natoli |
| 6,400,374 B2 | 6/2002 | Lanier |
| 6,407,870 B1 | 6/2002 | Hurevich et al. |
| 6,414,672 B2 | 7/2002 | Rekimoto et al. |
| 6,445,815 B1 | 9/2002 | Sato |
| 6,454,419 B2 | 9/2002 | Kitazawa |
| 6,480,267 B2 | 11/2002 | Yanagi et al. |
| 6,491,396 B2 | 12/2002 | Karasawa et al. |
| 6,501,515 B1 | 12/2002 | Iwamura |
| 6,522,312 B2 | 2/2003 | Ohshima et al. |
| 6,545,706 B1 | 4/2003 | Edwards et al. |
| 6,552,760 B1 | 4/2003 | Gotoh et al. |
| 6,598,978 B2 | 7/2003 | Hasegawa |
| 6,607,275 B1 | 8/2003 | Cimini et al. |
| 6,611,241 B1 | 8/2003 | Firester et al. |
| 6,654,734 B1 | 11/2003 | Mani et al. |
| 6,658,150 B2 | 12/2003 | Tsuji et al. |
| 6,661,918 B1 | 12/2003 | Gordon et al. |
| 6,677,969 B1 | 1/2004 | Hongo |
| 6,707,054 B2 | 3/2004 | Ray |
| 6,707,444 B1 | 3/2004 | Hendriks et al. |
| 6,712,476 B1 | 3/2004 | Ito et al. |
| 6,720,949 B1 | 4/2004 | Pryor et al. |
| 6,732,929 B2 | 5/2004 | Good et al. |
| 6,747,666 B2 | 6/2004 | Utterback |
| 6,752,720 B1 | 6/2004 | Clapper et al. |
| 6,754,370 B1 | 6/2004 | Hall-Holt et al. |
| 6,791,700 B2 | 9/2004 | Omura et al. |
| 6,826,727 B1 | 11/2004 | Mohr et al. |
| 6,831,664 B2 | 12/2004 | Marmaropoulos et al. |
| 6,871,982 B2 | 3/2005 | Holman et al. |
| 6,877,882 B1 | 4/2005 | Haven et al. |
| 6,912,313 B2 | 6/2005 | Li |
| 6,965,693 B1 * | 11/2005 | Kondo et al. ............... 382/190 |
| 6,971,700 B2 | 12/2005 | Blanger et al. |
| 6,975,360 B2 | 12/2005 | Slatter |
| 6,999,600 B2 | 2/2006 | Venetianer |
| 7,015,894 B2 | 3/2006 | Morohoshi |
| 7,042,440 B2 | 5/2006 | Pryor |
| 7,054,068 B2 | 5/2006 | Yoshida et al. |
| 7,058,204 B2 | 6/2006 | Hildreth et al. |
| 7,068,274 B2 | 6/2006 | Welch et al. |
| 7,069,516 B2 | 6/2006 | Rekimoto |
| 7,084,859 B1 | 8/2006 | Pryor |
| 7,088,508 B2 | 8/2006 | Ebina et al. |
| 7,149,262 B1 | 12/2006 | Nayar et al. |
| 7,158,676 B1 | 1/2007 | Rainsford |
| 7,170,492 B2 | 1/2007 | Bell |
| 7,190,832 B2 | 3/2007 | Frost et al. |
| 7,193,608 B2 | 3/2007 | Stuerzlinger |
| 7,227,526 B2 * | 6/2007 | Hildreth et al. ............... 345/156 |
| 7,259,747 B2 | 8/2007 | Bell |
| 7,262,874 B2 | 8/2007 | Suzuki |
| 7,289,130 B1 | 10/2007 | Satoh et al. |
| 7,330,584 B2 * | 2/2008 | Weiguo et al. ............... 382/154 |
| 7,339,521 B2 | 3/2008 | Scheidemann et al. |
| 7,348,963 B2 | 3/2008 | Bell |
| 7,379,563 B2 * | 5/2008 | Shamaie ............... 382/103 |
| 7,382,897 B2 * | 6/2008 | Brown et al. ............... 382/103 |
| 7,394,459 B2 | 7/2008 | Bathiche et al. |
| 7,428,542 B1 | 9/2008 | Fink et al. |
| 7,432,917 B2 | 10/2008 | Wilson et al. |
| 7,536,032 B2 | 5/2009 | Bell |
| 7,559,841 B2 | 7/2009 | Hashimoto |
| 7,576,727 B2 | 8/2009 | Bell |
| 7,598,942 B2 | 10/2009 | Underkoffler et al. |
| 7,619,824 B2 | 11/2009 | Poulsen |
| 7,665,041 B2 | 2/2010 | Wilson et al. |
| 7,710,391 B2 | 5/2010 | Bell et al. |
| 7,737,636 B2 | 6/2010 | Li et al. |
| RE41,685 E | 9/2010 | Feldman et al. |
| 7,809,167 B2 | 10/2010 | Bell |
| 7,834,846 B1 | 11/2010 | Bell |
| 2001/0012001 A1 | 8/2001 | Rekimoto et al. |
| 2001/0033675 A1 | 10/2001 | Maurer et al. |
| 2002/0006583 A1 | 1/2002 | Michiels et al. |
| 2002/0032697 A1 | 3/2002 | French et al. |
| 2002/0041327 A1 | 4/2002 | Hildreth et al. |
| 2002/0064382 A1 | 5/2002 | Hildreth et al. |
| 2002/0081032 A1 * | 6/2002 | Chen et al. ............... 382/199 |
| 2002/0103617 A1 | 8/2002 | Uchiyama et al. |
| 2002/0105623 A1 | 8/2002 | Pinhanez |
| 2002/0130839 A1 | 9/2002 | Wallace et al. |
| 2002/0140633 A1 | 10/2002 | Rafii et al. |
| 2002/0140682 A1 | 10/2002 | Brown et al. |
| 2002/0178440 A1 | 11/2002 | Agnihotri et al. |
| 2002/0186221 A1 | 12/2002 | Bell |
| 2003/0032484 A1 | 2/2003 | Ohshima et al. |
| 2003/0076293 A1 | 4/2003 | Mattsson |
| 2003/0093784 A1 | 5/2003 | Dimitrova et al. |
| 2003/0098819 A1 | 5/2003 | Sukthankar et al. |
| 2003/0103030 A1 | 6/2003 | Wu |
| 2003/0113018 A1 | 6/2003 | Nefian et al. |
| 2003/0122839 A1 | 7/2003 | Matraszek et al. |
| 2003/0137494 A1 | 7/2003 | Tulbert |
| 2003/0161502 A1 * | 8/2003 | Morihara et al. ............... 382/115 |
| 2003/0178549 A1 | 9/2003 | Ray |
| 2004/0005924 A1 | 1/2004 | Watabe et al. |
| 2004/0015783 A1 | 1/2004 | Lennon et al. |
| 2004/0046736 A1 | 3/2004 | Pryor et al. |
| 2004/0046744 A1 | 3/2004 | Rafii et al. |
| 2004/0073541 A1 | 4/2004 | Lindblad et al. |
| 2004/0091110 A1 | 5/2004 | Barkans |
| 2004/0095768 A1 | 5/2004 | Watanabe et al. |
| 2004/0183775 A1 | 9/2004 | Bell |
| 2005/0088407 A1 | 4/2005 | Bell |
| 2005/0089194 A1 | 4/2005 | Bell |
| 2005/0104506 A1 | 5/2005 | Youh et al. |
| 2005/0110964 A1 | 5/2005 | Bell |
| 2005/0122308 A1 | 6/2005 | Bell et al. |
| 2005/0132266 A1 | 6/2005 | Ambrosino et al. |
| 2005/0147282 A1 * | 7/2005 | Fujii ............... 382/124 |
| 2005/0162381 A1 | 7/2005 | Bell et al. |
| 2005/0185828 A1 * | 8/2005 | Semba et al. ............... 382/124 |

| | | | |
|---|---|---|---|
| 2005/0195598 A1 | 9/2005 | Dancs et al. | |
| 2005/0265587 A1* | 12/2005 | Schneider | 382/124 |
| 2006/0010400 A1 | 1/2006 | Dehlin et al. | |
| 2006/0031786 A1 | 2/2006 | Hillis et al. | |
| 2006/0132432 A1 | 6/2006 | Bell | |
| 2006/0139314 A1 | 6/2006 | Bell | |
| 2006/0168515 A1 | 7/2006 | Dorsett, Jr. et al. | |
| 2006/0184993 A1 | 8/2006 | Goldthwaite et al. | |
| 2006/0187545 A1 | 8/2006 | Doi | |
| 2006/0227099 A1 | 10/2006 | Han et al. | |
| 2006/0242145 A1 | 10/2006 | Krishnamurthy et al. | |
| 2006/0256382 A1 | 11/2006 | Matraszek et al. | |
| 2006/0258397 A1 | 11/2006 | Kaplan et al. | |
| 2006/0294247 A1 | 12/2006 | Hinckley et al. | |
| 2007/0285419 A1 | 12/2007 | Givon | |
| 2008/0040692 A1 | 2/2008 | Sunday et al. | |
| 2008/0062123 A1 | 3/2008 | Bell | |
| 2008/0090484 A1 | 4/2008 | Lee et al. | |
| 2008/0150890 A1 | 6/2008 | Bell et al. | |
| 2008/0150913 A1 | 6/2008 | Bell et al. | |
| 2008/0170776 A1 | 7/2008 | Albertson et al. | |
| 2008/0245952 A1 | 10/2008 | Troxell et al. | |
| 2008/0252596 A1 | 10/2008 | Bell et al. | |
| 2009/0027337 A1 | 1/2009 | Hildreth | |
| 2009/0077504 A1 | 3/2009 | Bell et al. | |
| 2009/0102788 A1* | 4/2009 | Nishida et al. | 345/158 |
| 2009/0225196 A1 | 9/2009 | Bell et al. | |
| 2009/0235295 A1 | 9/2009 | Bell et al. | |
| 2009/0251685 A1 | 10/2009 | Bell et al. | |
| 2010/0026624 A1 | 2/2010 | Bell et al. | |
| 2010/0039500 A1 | 2/2010 | Bell et al. | |
| 2010/0060722 A1 | 3/2010 | Bell et al. | |
| 2010/0121866 A1 | 5/2010 | Bell et al. | |

FOREIGN PATENT DOCUMENTS

| | | |
|---|---|---|
| EP | 0626636 A2 | 11/1994 |
| EP | 0913790 A1 | 5/1999 |
| EP | 1689172 A1 | 6/2002 |
| JP | 57094672 | 6/1982 |
| JP | 2000-105583 | 4/2000 |
| JP | 2002-014997 | 1/2002 |
| JP | 2002-092023 | 3/2002 |
| JP | 2002-171507 | 6/2002 |
| JP | 2003-517642 | 5/2003 |
| JP | 2003-271084 | 9/2003 |
| KR | 2003-0058894 | 7/2003 |
| WO | WO 98/38533 | 9/1998 |
| WO | WO 00/16562 | 3/2000 |
| WO | WO 01/063916 | 8/2001 |
| WO | WO 02/01537 A2 | 1/2002 |
| WO | WO 02/100094 A2 | 12/2002 |
| WO | WO 2004/055776 | 7/2004 |
| WO | WO2004097741 * | 11/2004 |
| WO | WO 2005/041578 A2 | 5/2005 |
| WO | WO 2005/041579 A3 | 5/2005 |
| WO | WO 2005/057398 A2 | 6/2005 |
| WO | WO 2005/057399 A2 | 6/2005 |
| WO | WO 2005/057921 A2 | 6/2005 |
| WO | WO 2005/091651 A2 | 9/2005 |
| WO | WO 2007/019443 A1 | 2/2007 |
| WO | WO 2008/124820 A1 | 10/2008 |
| WO | WO 2009/035705 A1 | 3/2009 |

OTHER PUBLICATIONS

Brown et al. "Multi-Image Matching using Multi-Scale Oriented Patches" Technical Report, Dec. 2004, pp. 1- 48 ftp://ftp.research.microsoft.com/pub/tr/TR-2004-133.pdf.*

Brown et al. "Multi-Image Matching using Multi-Scale Oriented Patches", Proceedings of the 2005 IEEE Computer Society Conference on Computer Vision and Pattern Recognition, Conference on Publication Date: Jun. 20-25, 2005.*

Schneider, John K. "Fingerprint System Using Rolled and Multi-Segmented Enrollment Techniques" , U.S. Appl. No. 60/575,952, filed Jun. 1, 2004, pp. 1-6.*

"Bodymover Body Movement as a Means to Obtain an Audiovisual Spatial Experience" 2000 ART+COM AG Berlin; <http://www.artcome/de/index.php?option=com_acprojects&page=6&id=28&Itemid=144&details=0&lang=en>.

"EffecTV" Version 0.2.0 released Mar. 27, 2001, available online at <http://web.archive.org/web/20010101-20010625re_http://effectv.sourceforge.net>.

"Index of EffecTV", as downloaded on Apr. 30, 2007 at <http://effectv.cvs.sourceforge.net/effectv/EffecTV/?pathrev=rel_0_2_0>.

"R111, The Transformation From Digital Information to Analog Matter" available online at <http://www.particles.de/paradocs/r111/10mkp2004/hmtl/r111_text111hock04.html>.

"Supreme Particles; R111," 1999, available online at <http://www.r111.org>, XP-002989704.

Buxton, Bill, "Multi-Touch Systems That I Have Known and Loved," accessed Mar. 21, 2007, http://billbuxton.com/multitouchOverview.html.

2001 Symposium on Interactive 3D Graphics program description, ACM SIGGRAPH, held Mar. 19-21, 2001, Research Triangle Park, NC, downloaded from <http://www.allconferences.com/conferences/2000830092631/>; cited during opposition of EP Appln. No. 02739710.8, filed Jun. 4, 2002.

Affidavit of Daniel Barthels regarding EffecTV, dated May 15, 2007, cited during opposition of EP Appln. No. 02739710.8, filed Jun. 4, 2002.

Announcement: Workshop on Perceptual User Interfaces, The Banff Rocky Mountain Resort, Banff, Alberta, Canada, Oct. 20-21, 1997, can be found at <http://www.research.microsoft.com/PUIWorkshop/>, cited during opposition of EP Appln. No. 02739710.8, filed Jun. 4, 2002.

ART+COM Bodymover 2000, as downloaded on Aug. 21, 2009 from <http://www.artcom.de/index.php?option=com_acprojects&page=6&id=28&Itemid=144&details=0&lang=en>, cited during opposition of Ep Appln. No. 02739710.8, filed Jun. 4, 2002.

Communication dated Dec. 2, 2008 from Patentanwalt attaching article by Katy Bachman, entitled "Reactrix Up for Sale," cited during opposition of EP Appln. No. 02739710.8, filed Jun. 4, 2002.

Crouser, P.D., et al., "Unattenuated tracer particle extraction through time-averaged, background image subtraction with outlier rejection," Experiments in Fluids, 22, 1997, 220-228, Springer-Verlag.

Dachselt, Raimund, et al., "Contigra: An XML-Based Architecture for Component-Oriented 3D Applications, 3D Technologies for the World Wide Web, Proceedings of the Seventh International Conference on 3D Technology," ACM-2002, pp. 155-163.

Davis, J.W., et al., "SIDEshow: A Silhouette-based Interactive Dual-screen Environment," Aug. 1998, MIT Media Lab Tech Report No. 457.

Demarest, Ken, "Sand," 2000, Mine Control, art installation, available online at <http://www.mine-control.com>.

EffecTV Software Source: effect module, dated May 20, 2001; cited during opposition of EP Appln. No. 02739710.8, filed Jun. 4, 2002.

Elgammal, Ahmed, et al., "Non-parametric Model for Background Subtraction," Jun. 2000, European Conference on Computer Vision, Lecture Notes on Computer Science, vol. 1843, pp. 751-767.

Foerterer, Holger, "Fluidum," 1999, art installation, description available online at <http://www.foerterer.com/fluidum>.

Foerterer, Holger, "Helikopter," 2001, art installation, description available online at <http://www.foerterer.com/helikopter>.

Freeman, William, et al., "Computer vision for interactive computer graphics," May-Jun. 1998, IEEE Computer Graphics and Applications, vol. 18, No. 3, pp. 42-53.

Frisken, Sarah F. et al., "Adaptively Sampled Distance Fields: A General Representation of Shape for Computer Graphics," 2000, Proc. of the 27th Annual Conf. on Computer Graphics and Interactive Techniques, pp. 249-254.

Fujihata, Masaki, "Beyond Pages," 1995, art installation, description available online at <http://on1.zkm.de/zkm/werke/BeyondPages>.

Goetz, Frank, et al., "An XML-based Visual Shading Language for Vertex and Fragment Shaders," 3D Technologies for the World Wide Web, Proceedings of Ninth International Conference on 3D Technology; ACM—2004; pp. 87-97.

GroundFX Document, GestureTek (Very Vivid, Inc.), description available online at <http://www.gesturetek.com/groundfx>, downloaded on Aug. 11, 2006.

Haller, Michael et al., "Coeno-Storyboard: An Augmented Surface for Storyboard Presentations," Mensch & Computer 2005, Sep. 4-7, 2005, Linz, Austria.

Han, Jefferson Y., "Low-Cost Multi-Touch Sensing Through Frustrated Total Internal Reflection," 2005, ACM Symposium on User Interface Software and Technology (UIST).

Harville, Michael et al., "Foreground Segmentation Using Adaptive Mixture Models in Color and Depth," 2001, Proc of IEE Workshop on Detection and Recognition of Events in Video, pp. 3-11.

Hemmer, Raphael Lozano, "Body Movies," 2002, art project/installation, description available online at <http://www.lozano-hemmer.com/eproyecto.html>.

Hoff, Kenneth E. III et al, "Fast and Simple 2D Geometric Proximity Queries Using Graphics Hardware," 2001, Proc. of the 2001 Symposium on Interactive 3D Graphics, pp. 145-148.

Katz, Itai et al., "A Multi-Touch Surface Using Multiple Cameras," 2007, Advanced Concepts for Intelligent Vision Systems, vol. 4678/2007.

Jabri, Sumer et al., "Detection and Location of People in Video Images Using Adaptive Fusion of Color and Edge Information;" presented at the Int. Conf. Pattern Recognition, Barcelona, Spain, 2000.

Joyce, Arthur W. III, et al., "Implementation and capabilities of a virtual interaction system," 1998, Proc. 2nd Euro. Conf. Disability, Virtual Reality & Assoc. Tech., Skovde, Sweden, pp. 237-245.

Keays, Bill, "metaField Maze," 1998, exhibited at Siggraph'99 Emerging Technologies and Ars Electronica 1999, description available online at <http://www.billkeays.com/metaFieldInfosheet1A.pdf>.

Keays, Bill, "Using High-Bandwidth Input/Output in Interactive Art," Jun. 1999, Master's Thesis, Massachusetts Institute of Technology, School of Architecture and Planning.

Khan, Jeff; "Intelligent Room with a View"; Apr.-May 2004, RealTime Arts Magazine, Issue 60, available online at www.realtimearts.net/article/60/7432.

Kjeldsen, R. et al., "Interacting with Steerable Projected Displays," 2002, Proc. of the 5th International Conference on Automatic Face and Gesture Recogniton, Washington, D.C.

Kreuger, Myron, "Videoplace—An Artificial Reality," Apr. 1985, Conference on Human Factors in Computing Systems, San Francisco, California, pp. 35-40.

Kreuger, Myron, "Videoplace," 1969 and subsequent, summary available online at <http://www.jtnimoy.com/itp/newmediahistory/videoplace>.

Kurapati, Kaushal, et al., "A Multi-Agent TV Recommender," 2001, Workshop on Personalization in Future TV, pp. 1-8, XP02228385.

Lamarre, Mathieu, et al., "Background subtraction using competing models in the block-DCT domain," Pattern Recognition, 2002 Proceedings, 16 International Conference in Quebec City, Que., Canada, Aug. 11-15, 2002, Los Alamitos, CA, USA, IEEE COMPUT SOC US, vol. 1, pp. 299-302.

Leibe, Bastian, et al., "Toward Spontaneous Interaction with the Perceptive Workbench, a Semi-Immersive Virtual Environment," Nov./Dec. 2000, IEEE Computer Graphics and Applications, vol., 20, No. 6, pp. 54-65.

Lengyel, Jed et al., "Real-Time Robot Motion Planning Using Rasterizing Computer Graphics Hardware," Aug. 1990, ACM SIGGRAPH Computer Graphics, vol. 24, Issue 4, pp. 327-335.

Levin, Golan, "Computer Vision for Artists and Designers: Pedagogic Tools and Techniques for Novice Programmers," Aug. 2006, AI & Society, vol. 20, Issue 4, pp. 462-482.

Letter dated May 16, 2007 from Christian Zuckschwerdt regarding EffecTV, (partial machine translation), cited during opposition of EP Appln. No. 02739710.8, filed Jun. 4, 2002.

Lin, Mingxiu et al., "A New Approach for Vision-based Rear Vehicle Tracking," Key Laboratory of Integrated Automation of Process Industry, Ministry of Education, Northeastern University, Shenyang, Liaoning Province, China, held May 23-25, 2007, pp. 107-111.

Livingston, Mark Alan, "Vision-based Tracking with Dynamic Structured Light for Video See-through Augmented Reality," 1998, Ph.D. Dissertation, University of North Carolina at Chapel Hill.

MacIver, Malcolm, et al., "Body Electric," 2003, art installation, description available online at <http://www.neuromech.northwestern.edu/uropatagium/#ArtSci>.

Malik, Shahzad et al., "Visual Touchpad: A Two-Handed Gestural Input Device," Oct. 13-15, 2004, International Conference on Multimodal Interfaces (ICMI '04).

Mandala Systems, "Video Gesture Control System Concept," 1986, description available online at <http://www.vividgroup.com/tech.html>.

Mitsubishi DiamondTouch, http://www.merl.com/projects/DiamondTouch/, visited Mar. 21, 2007.

Mo, Zhenyao, "SmartCanvas: A Gesture-Driven Intelligent Drawing Desk System," Jan. 9-12, 2005, Proceedings of Intelligent User Interfaces (IUI '05).

Morano, Raymond A. et al., "Structured Light Using Pseudorandom Codes," Mar. 1998, IEEE Transactions on Pattern Analysis and Machine Intelligence, vol. 20, No. 3.

Muench, Wolfgang, "Bubbles", 1999 Prix Ars Electonica Catalog 1999, Springer-Verlag, Berlin, Germany; available online at <http://hosting/zkm/de/wmuench/bub/text>.

Observation by third party Simon Penny dated Jan. 4, 2005, cited during opposition of EP Appln. No. 02739710.8, filed Jun. 4, 2002.

Paradiso, Joseph et al., "New Sensor and Music Systems for Large Interactive Surfaces," 2000, proc. of the Interactive Computer Music Conference, Berlin, Germany, pp. 277-280.

Penny, et al.; "Traces: Wireless Full Body Tracking in the Cave"; Dec. 99; Japan; ICAT Virtual Reality Conference; <http://turing.ace.uci.edu/pennytexts/traces/>.

Penny, Simon, et al., "Fugitive II, " 2004, Australian Center for the Moving Image, art installation, description available online at <http://www.acmi.net.au/fugitive.jsp?>.

Penny, Simon; "Fugitive"; 1995-7; <http://www.ace.uci.edu/penny/works/fugitive/fugitive.html>.

Pinhanez, C. et al., "Ubiquitous Interactive Graphics," 2002, IBM Research Report RC22495, available at <http://www.research.ibm.com/ed/publications/rc22495.pdf>.

Pinhanez, C., "The Everywhere Displays Projector: A Device to Create Ubiquitous Graphical Interfaces," 2001, Proc. of the UbiComp 2001 Conference, Ubiquitous Computig Lecture Notes in Computer Science, Springer-Verlag, Berlin, Germany, pp. 315-331.

Plasma; 3 pages; <http://www.particles.de/paradocs/plasma/index.html>, cited in U.S. Appl. No. 10/160,217, filed Aug. 8, 2005.

Reactrix, Inc. website, Mar. 28, 2003, <http://web.archive.org/web/20030328234205/http://www.reactrix.com> and <http://web.archive.org/web/20030328234205/http://www.reactrix.com/webdemo.php>.

Rekimoto, J., et al., "Perceptual Surfaces: Towards a Human and Object Sensitive Interactive Display," 1997, Proc. of the Workshop on Perceptual User Interfaces, Banff, Canada, pp. 30-32.

Ringel, M. et al., "Barehands: Implement-Free Interaction with a Wall-Mounted Display," 2001, Proc. of the 2001 ACM CHI Conference on Human Factors in Computing Systems (Extended Abstracts), p. 367-368.

Rogala, Miroslav, "Lovers Leap," 1994, art installation, Dutch Electronic Arts Festival, description available online at <http://wayback.v2.nl/DEAF/persona/rogala.html>.

Rokeby, David, "softVNS 2 real time video processing and tracking software for Max;" SoftVNS 2 downloads, as downloaded from <http://homepage.mac.com/davidrokeby/softVNS.html> on Mar. 16, 2007.

Rokeby, David, "Very Nervous System (VNS)," Mar. 1995, Wired Magazine, available online at <http://www.wired.com/wired/archive/3.03/rokeby.html>; sold as software at <http://homepage.mac.com/davidrokeby/softVNS.html>.

Sato, Yoichi, et al., "Fast Tracking of Hands and Fingertips in Infrared Images for Augmented Desk Interface," Mar. 2000, 4th International Conference on Automatic Face-and Gesture-Recognition, Grenoble, France.

Screenshots of Reactrix Product Demo Video, Mar. 28, 2003, <http://web.archive.org/web/20030407174258/http://www.reactrix.com/demo/reactrix_demo.wmv>.

Sester, Marie, "Access," 2001, Interaction 99 Biennial Catalog, Gifu, Japan, available online at <http://www.accessproject.net/concept.html>.
Snibbe, Scott, "Boundary Functions," 1998, art installation, description available online at <http://snibbe.corn/scott/bf/index.html>.
Snibbe, Scott, "Screen Series," 2002-2003 art installation, description available online at <http://snibbe.com/scott/screen/index.html>.
Sonneck, Georg, et al., "Optimized One-to-One Personalization of Web Applications using a Graph Based Model," IEEE-22, Apr. 26, 2003, 9 pgs.
Sparacino, Flavia, "(Some) computer visions based interfaces for interactive art and entertainment installations," 2001, INTER_FACE Body Boundaries, Anomalie digital_arts, No. 2, Paris, France.
Sparacino, Flavia, et al., "Media in performance: interactive spaces for dance, theater, circus and museum exhibits," 2000, IBM Systems Journal, vol. 39, No. 3-4, pp. 479-510.
Stauffer, Chris, et al., "Learning Patterns of Activity Using Real-Time Tracking," Aug. 2000, IEEE Transaction on Pattern Analysis and Machine Intelligence, vol. 22, No. 8, pp. 747-757.
Torr, P.H.S. et al., "The Development and Comparison of Robust Methods for Estimating the Fundamental Matrix," 1997, International Journal of Computer Vision, vol. 24, No. 3, pp. 271-300.
Supreme Particles, "Plasma/Architexture," 1994, available online at <http://www.particles.de/paradocs/plasma/index.html>.
Tan, P., et al "Highlight Removal by Illumination-Constrained Inpainting," Ninth IEEE International Conference on Computer Vision, 2003.
Toth, Daniel et al., "Illumination-Invariant Change Detection," 2000 4th IEEE Southwest Symposium on Image Analysis and Interpretation, p. 3.
Trefzger, Petra, "Vorwerk," 2000, art installation, description available online at <http://www.petracolor.de>.
Utterback, Camille, et al., "Text Rain,"1999, art installation, available online at <www.camilleutterback.com/textrain.html>.
Vogt, Florian et al., "Highlight Substitution in Light Fields," IEEE International Conference on Image Processing 2002.
Wang, Junxian, et al., "Specular reflection removal for human detection under aquatic environment," 2004 IEEE Conference on Computer and Pattern Recognition Workshop (CVPRW04) vol. 8, p. 130.
Wellner, Pierre, "Interacting with paper on the DigitalDesk," Jul. 1993, Communications of the ACM, Special issue on computer augmented environments: back to the real world, vol. 36, Issue 7, pp. 87-96.
Wilson, Andrew, "PlayAnywhere: A Compact Interactive Tabletop Projection-Vision System," ACM Symposium on User Interface Software and Technology (UIST), 2005.
Written Opinion of the International Searching Authority for PCT/US2004/035477, filed Oct. 25, 2004.
International Preliminary Report on Patentability for PCT/US2004/035477, filed Oct. 25, 2004.
International Search Report for PCT/US2004/035477, filed Oct. 25, 2004.
International Search Report for PCT/US2004/041318, filed Dec. 9, 2004.
Written Opinion of the International Searching Authority for PCT/US2004/041318, filed Dec. 9, 2004.
International Preliminary Report on Patentability for PCT/US2004/041318, filed Dec. 9, 2004.
International Search Report for PCT/US2006/030720, filed Aug. 4, 2006.
Written Opinion of the International Searching Authority for PCT/US2006/030720, filed Aug. 4, 2006.
International Preliminary Report on Patentability for PCT/US2006/030720, filed Aug. 4, 2006.
International Search Report for PCT/US2005/008984, filed Mar. 18, 2005.
Written Opinion of the International Searching Authority for PCT/US2005/008984, filed Mar. 18, 2005.
International Preliminary Report on Patentability for PCT/US2005/008984, filed Mar. 18, 2005.
International Search Report for PCT/US2004/041320, filed Dec. 9, 2004.
Written Opinion of the International Searching Authority for PCT/US2004/041320, filed Dec. 9, 2004.
International Preliminary Report on Patentability for PCT/US2004/041320, filed Dec. 9, 2004.
Written Opinion of the International Searching Authority for PCT/US2004/041319, filed Dec. 9, 2004.
International Preliminary Report on Patentability for PCT/US2004/041319, filed Dec. 9, 2004.
International Search Report for PCT/WO 02/100094, filed Dec. 9, 2004.
International Preliminary Examination Report for PCT/US2002/017843, filed Jun. 4, 2002.
International Search Report for PCT/US2002/017843, filed Jun. 4, 2002.
Written Opinion of the International Searching Authority for PCT/US2004/035478, filed Oct. 25, 2004.
International Preliminary Report on Patentability for PCT/US2004/035478, filed Oct. 25, 2004.
Invitation to Pay Additional Fees and Partial International Search for PCT/US2004/035478, filed Oct. 25, 2004.
International Search Report for PCT/US2008/059900, filed Apr. 10, 2008.
International Search Report for PCT/US2004/035478, filed Oct. 25, 2004.
International Search Report for PCT/US2008/10750, filed Sep. 15, 2008.
International Search Report for PCT/US03/40321, filed Dec. 15, 2003.
Official Communication in Chinese Appln. No. 200480030951.8 dated Mar. 27, 2009.
Official Communication in Chinese Appln. No. 200480034551.4 dated May 19, 2008.
Official Communication in European Appln. No. 2002312346 dated Nov. 14, 2006.
Official Communication in Chinese Appln. No. 02815206.9 dated Dec. 12, 2008.
Notice of Opposition in European Appln. No. 02739710.8 dated May 14, 2007.
Summons to Attend Oral Proceedings in European Appln. No. 02739710.8.
Article 96(2) Communication dated Mar. 31, 2004 in European Appln. No. 02739710.8.
Article 96(2) Communication dated Feb. 25, 2005 in European Appln. No. 02739710.8.
Extended Search Report for EP 06010825.5, filed Jun. 4, 2002.
"Microsoft Surface multi-touch interface table unveiled", May 30, 2007, downloaded from http://www.dancewithshadows.com/tech/microsoft-surface.asp.
Microsoft Surface Web Page, downloaded from http://www.microsoft.com/surface/Pages/Product/Whatls.aspx on Sep. 24, 2009.
"Experience Microsoft Surface," downloaded from http://www.microsoft.com/surface/Pages/Product/Specifications.aspx on Sep. 24, 2009.
Microsoft Surface, downloaded from http://en.wikipedia.org/wiki/Microsoft_surface on Sep. 24, 2009.
The History of Microsoft Surface, downloaded from http://www.microsoft.com/presspass/presskits/surfacecomputing/docs/SurfaceHistoryBG.doc on Sep. 24, 2009.
Morris, T. et al., "Real-Time Fingertip Detection for Hand Gesture Recognition," Sep. 9-11, 2002, Advanced Concepts for Intelligent Vision Systems (ACIVS '04), Ghent University, Belgium.
International Preliminary Report on Patentability for PCT/US2008/059900, filed on Apr. 10, 2008.
Ivars Peterson, "Artificial reality; combining a person's live video image with computer graphics suggests novel ways of working and playing with computers" Science News, Jun. 22, 1985.
Kjeldesn, Rick et al., "Dynamically Reconfigurable Vision-Based User Interfaces," Apr. 2003, 3rd International Conference on Vision Systems (IVVS '03), Graz, Austria, pp. 6-12.
Provision of the minutes in European Application No. 02739710.8 dated Dec. 28, 2009.
Decision revoking the European Patent in European Application No. 02739710.8 dated Dec. 28, 2009.

Observation by third party Michael Saup dated Jan. 17, 2005, cited during opposition of European Application No. 02739710.8, filed Jun. 4, 2002.

Observation by third party Petra Trefzger dated Jan. 17, 2005, cited during opposition of European Application No. 02739710.8, filed Jun. 4, 2002.

Summons to Attend Oral Proceedings in European Application No. 02739710.8, dated Jun. 12, 2009.

Wellner, Pierre, "Digital Desk Calculator:Tangible Manipulation on a Desktop Display" Proceedings of the Symposium on User Interface Software and Technol (UIST), Hilton Head, S. Carolina, Nov. 11-13, 1991.

Written Opinion for PCT/US2002/017843, filed Jun. 4, 2002.

Written Opinion of the International Searching Authority for PCT/US2008/059900, filed Apr. 10, 2008.

International Preliminary Report on Patentability for PCT/US2008/10750, filed Sep. 15, 2008.

Letter of the opponent O2 dated May 28, 2010 in European Application No. 02739710.8, filed Jun. 4, 2002.

International Preliminary Report on Patentability for PCT/US2008/10750, filed Sep. 15, 2008.

Letter of the Opponent O2 dated May 28, 2010 in European Application No. 02739710.8, filed Jun. 4 2002.

Notice of Opposition in European Application No. 02739710.8, dated Aug. 23, 2010.

Maria Langer, "Mac OS X 10.2: Visual QuickStart Guide," Sep. 17, 2002, Peachpit Press, p. 111.

Rekimoto, Jun, "SmartSkin: An Infrastructure for Freehand Manipulation on Interactive Surfaces," vol. No.4, Issue No. 1, pp. 113-120, Apr. 2002.

Xiao, Yang; "Throughput and Delay Limits of IEEE 802.11," IEEE Communications Letters, vol. 6, No. 8, pp. 355-357, Aug. 2002.

* cited by examiner

[ 500a multiplied by value image 300 of figure 3 equals Result 500b ]

SYSTEM AND METHOD FOR SENSING A FEATURE OF AN OBJECT IN AN INTERACTIVE VIDEO DISPLAY

FIELD OF THE INVENTION

Embodiments of the present invention are related to the field of video image processing. More specifically, embodiments of the present invention relate to automatically identifying features of objects in an interactive video display system.

BACKGROUND OF THE INVENTION

One aspect of image processing includes human-computer interaction by detecting human forms and movements to allow interaction with images. Applications of such processing can use efficient or entertaining ways of interacting with images to define digital shapes or other data, animate objects, create expressive forms, etc.

Detecting the position and movement of a human body is referred to as "motion capture." With motion capture techniques, mathematical descriptions of a human performer's movements are input to a computer or other processing system. Natural body movements can be used as inputs to the computer to study athletic movement, capture data for later playback or simulation, enhance analysis for medical purposes, etc.

Motion capture techniques tend to be complex. Some techniques require the human actor to wear special suits with high-visibility points at several locations. Other approaches use radio frequency or other types of emitters, multiple sensors and detectors, blue screens, extensive post processing, etc. Techniques that rely on simple visible light image capture are not accurate enough to provide well-defined and precise motion capture.

Some motion capture applications allow an actor, or user, to interact with images that are created and displayed by a computer system. For example, an actor may stand in front of a large video screen projection of several objects. The actor can move, or otherwise generate, modify, and manipulate the objects by using body movements. Different effects based on an actor's movements can be computed by the processing system and displayed on the display screen. For example, the computer system can track a path of the actor in front of the display screen and render an approximation, or artistic interpretation of the path onto the display screen. The images with which the actor interacts can be, e.g., on the floor, wall, or other surface, suspended three-dimensionally in space, displayed on one or more monitors, projection screens or other devices. Any type of display device or technology can be used to present images with which a user can control or interact.

In some applications, such as point of sale, retail advertising, promotions, arcade entertainment sites, etc., it is desirable to capture the motion of an untrained user (e.g., a person passing by) in a very unobtrusive way. Ideally, the user will not need special preparation or training and the system will not use unduly expensive equipment. Also, the method and system used to motion capture the actor should be invisible or undetectable to the user. Many real world applications must work in environments where there are complex and changing background and foreground objects, short capture intervals and other factors that can make motion capture difficult.

SUMMARY OF THE INVENTION

Various embodiments of the present invention, a method and system for detecting a feature of an object in an interactive video display system, are described herein. In one embodiment of the invention, a tip of an object, e.g., a finger, is detected in a vision image. In another embodiment of the invention, a tip of a foot is detected in a vision image. In one embodiment of the invention, a memory stored template image comprising weighted values (e.g., a value image) is compared to pixels of a vision image to determine a feature of an object. In one embodiment of the invention, pixels of the foreground/background classification image (e.g., vision image) are multiplied by the corresponding values (for a particular orientation) of the value image to determine the degree that the object matches the value image. In one embodiment of the invention, multiple orientations of the value image are multiplied by the vision image to determine an orientation of the value image that best matches a feature of an object.

More specifically, embodiments of the present invention include a method for processing captured image information in an interactive video display system. The method includes accessing a region of a vision image. The method further includes comparing the region of the vision image to a first orientation of a value image. The value image comprises a plurality of weighted values representing a feature to be detected. The method further includes comparing the region of the vision image to a second orientation of the value image. The method further includes determining which orientation of the value image best matches the feature to be detected.

Embodiments of the present invention further include a system for processing captured image information in an interactive video display system. The system includes an input for receiving a region of a vision image. The system also includes a comparer for comparing the region of the vision image to a plurality of orientations of a value image. The value image comprises a plurality of weighted values representing a feature of the vision image to be detected. The system further includes a determiner for determining which of the plurality of orientations of the value image best matches the feature to be detected.

Embodiments of the present invention further include a computer usable medium having computer-readable program code embedded therein for causing a computer system to perform a method for processing captured image information in an interactive video display system as described above.

DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1A:
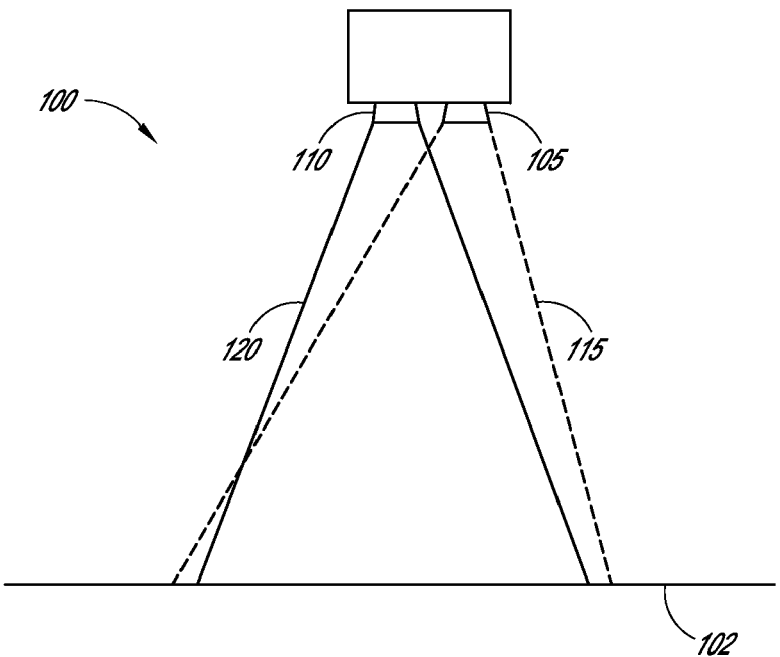
FIG. 1A illustrates a projection interactive video display system in accordance with an embodiment of the present invention.

Reference will now be made in detail to various embodiments of the invention, a system and method for sensing features of objects in an interactive video display system, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "sensing" or "comparing" or "multiplying" or "accessing" or "averaging" or "representing" or "transmitting" or "updating" or "identifying" or the like, refer to the action and processes of an electronic system (e.g., projection interactive video display system 100 of FIG. 1A), or similar electronic computing device, that manipulates and transforms data represented as physical (electronic) quantities within the electronic device's registers and memories into other data similarly represented as physical quantities within the electronic device memories or registers or other such information storage, transmission or display devices.

Various embodiments of the present invention in the form of one or more exemplary embodiments will now be described. The described embodiments may be implemented on an interactive video display system including a vision system that captures and processes information relating to a scene. The processed information is used to generate certain visual effects that are then displayed to human users via an interactive display device. Human users are able to interact with such visual effects on a real-time basis.

FIG. 1A illustrates a projection interactive video display system 100 in accordance with an embodiment of the present invention. Projection interactive video display system 100 uses a camera 105, a projector 110 that projects an image 120 onto the interactive space 115 of surface 102, and a local computer (not shown) that takes as input the image of camera 105 (e.g., vision image information) and outputs a video image to projector 110. Alternatively, a rear projection display screen can be used in lieu of a projector 110.

The local computer processes the camera 105 input to discern on a pixel-by-pixel basis what portions of the volume in front of surface 102 (e.g., interactive space 115) are occupied by people (or moving objects) and what portions of surface 102 are background e.g., static images. The local computer may accomplish this by developing several evolving models of what the background is believed to look like, and then comparing its concepts of the background to what camera 105 is currently imaging. Alternatively, components of the local computer that process camera 105 input are collectively known as the vision system. Various embodiments of projection interactive video display system 100 and the vision system are described in co-pending U.S. patent application Ser. No. 10/160,217, filed on May 28, 2002, entitled "INTERACTIVE VIDEO DISPLAY SYSTEM," by Bell, and assigned to the assignee of the present application, and in co-pending U.S. Provisional Patent Application No. 60/514,024, filed on Oct. 24, 2003, entitled "METHOD AND SYSTEM FOR PROCESSING CAPTURED IMAGE INFORMATION IN AN INTERACTIVE VIDEO SYSTEM," by Bell, and assigned to the assignee of the present application, both of which are herein incorporated by reference.

Figure 1B:
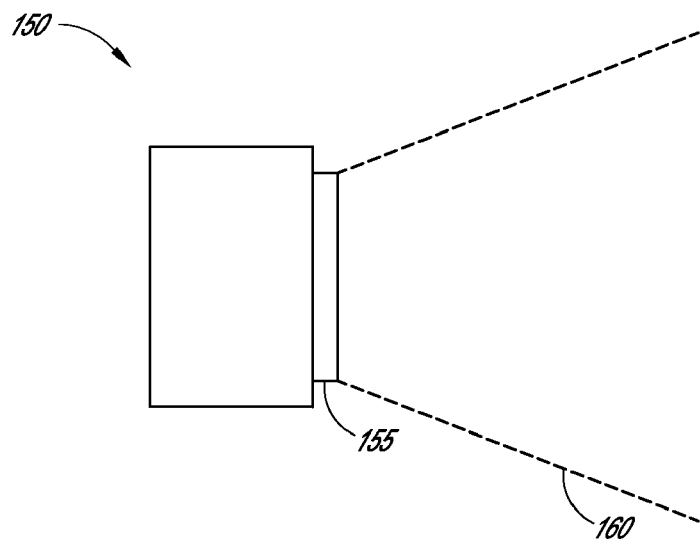
FIG. 1B illustrates a self-contained interactive video display system in accordance with an embodiment of the present invention.

FIG. 1B illustrates a self-contained interactive video display system 150 in accordance with an embodiment of the present invention. Self-contained interactive video display system 150 displays an image onto display screen 155, and uses a camera (not shown) to detect people and objects in interactive space 160. A local computer, also referred to as the image system, takes as input the image of the camera and outputs a video image to display screen 155.

Various embodiments of self-contained interactive video display system 150 are described in co-pending U.S. patent application Ser. No. 10/946,263, filed on Sep. 20, 2004, entitled "SELF-CONTAINED INTERACTIVE VIDEO DISPLAY SYSTEM," by Bell et al., and assigned to the assignee of the present application, co-pending U.S. patent application Ser. No. 10/946,084, filed on Sep. 20, 2004, entitled "SELF-CONTAINED INTERACTIVE VIDEO DISPLAY SYSTEM," by Bell, and assigned to the assignee of the present application, and co-pending U.S. patent application Ser. No. 10/946,414, filed on Sep. 20, 2004, entitled "INTERACTIVE VIDEO WINDOW DISPLAY SYSTEM," by Bell, and assigned to the assignee of the present application, all of which are herein incorporated by reference. Furthermore, various embodiments of the vision system are described in co-pending U.S. patent application Ser. No. 10/160,217, filed on May 28, 2002, entitled "INTERACTIVE VIDEO DISPLAY SYSTEM," by Bell, and assigned to the assignee of the present application, and in co-pending U.S. Provisional Patent Application No. 60/514,024, filed on Oct. 24, 2003, entitled "METHOD AND SYSTEM FOR PROCESSING CAPTURED IMAGE INFORMATION IN AN INTERACTIVE VIDEO SYSTEM," by Bell, and assigned to the assignee of the present application, both of which are herein incorporated by reference.

According to one embodiment of the interactive video display system (e.g., projection interactive video display system 100 of FIG. 1A), there is an input image from a monochrome camera (e.g., camera 105 of FIG. 1A) and a computer vision system that is able to separate foreground objects of interest (e.g., people) from the background of the input image in real time so that the location and outline of the foreground objects can serve as input to an interactive application.

The camera input image (e.g., vision image) is an image representing a real world scene viewed by the camera. This real world scene contains a static background of unknown brightness and appearance as well as various foreground objects that are able to move, such as, people and objects held or moved by people. The camera input image may be manipulated or cropped so that the area viewed by the camera corresponds to the boundaries of a display. Embodiments of the present invention determine a location and direction of a feature of the object in the foreground of the camera image.

The computer vision system outputs a foreground/background distinction (also referred to as a vision image) that corresponds to the camera input image. Each pixel in this image is capable of assuming one of two values: one value for foreground and another value for background. This pixel's value represents whether the vision system determines the pixel with the same position in the camera input image is foreground or background. In one exemplary embodiment, the foreground/background distinction image is an 8-bit grayscale image, with a pixel value of "0" for background and a pixel value of "255" for foreground. In some embodiments, the vision image may have gradated values representing probabilistic foreground/background assessments or other methods of representing vision information. Other implementations may represent foreground/background distinction using different techniques. In each case, the objective of the foreground/background distinction processing for the vision image is to generate a data structure that indicates the position and shape of input objects (e.g., people etc.) with interactive space.

The camera input image may be preprocessed before being input into the vision system. For example, the image may be blurred slightly to reduce noise or gamma corrected to increase or decrease the vision system's sensitivity to dark or light areas. In many cases, the camera input image may be cropped, linearly transformed, or otherwise calibrated. Other well-known ways and/or methods to preprocess the camera input image could also be used. In one embodiment of the invention, the resolution is decreased to save time for processing the image. In addition, if a pixel is determined to not be like the feature being detected, it can usually be assumed that neighboring pixels are not like the feature being detected.

Alternatively, the feature matching system may only be run on pixels that fall on the border between a foreground area and a background area on the vision image. In one embodiment of the invention, the feature being detected is a tip, e.g., a finger tip.

It is appreciated that the term "tip" has been used for illustrative purposes only. It is appreciated that embodiments of the present invention can be used to detect the location and orientation of any feature of foreground objects of an interactive video display system. The foreground object can be a user or any object held or manipulated by a user of the interactive video display system. For example, the feature being detected may be the shape formed by two arms crossing in an "X" shape. Or, the feature may correspond to two user's hands reaching toward each other but not touching. The feature detector can detect any feature of the vision image viewable by the camera.

Embodiments of the present invention determine a tip of an object in the foreground of the vision image to improve user interaction with images displayed by the interactive video display system. Embodiments of the present invention compare the objects of the foreground to template images (e.g., value images) to determine if the object is like the feature represented by the value image. For example, a vision image of an object is compared to a value image comprising weighted regions representing a tip.

In one embodiment of the invention, the foreground object is compared to a plurality of orientations of the value image. The orientation of the value image that is most tip-like can be used to determine the direction of the tip. This further improves user interaction with the displayed objects e.g., menu items, graphical elements, etc.

Figure 1C:
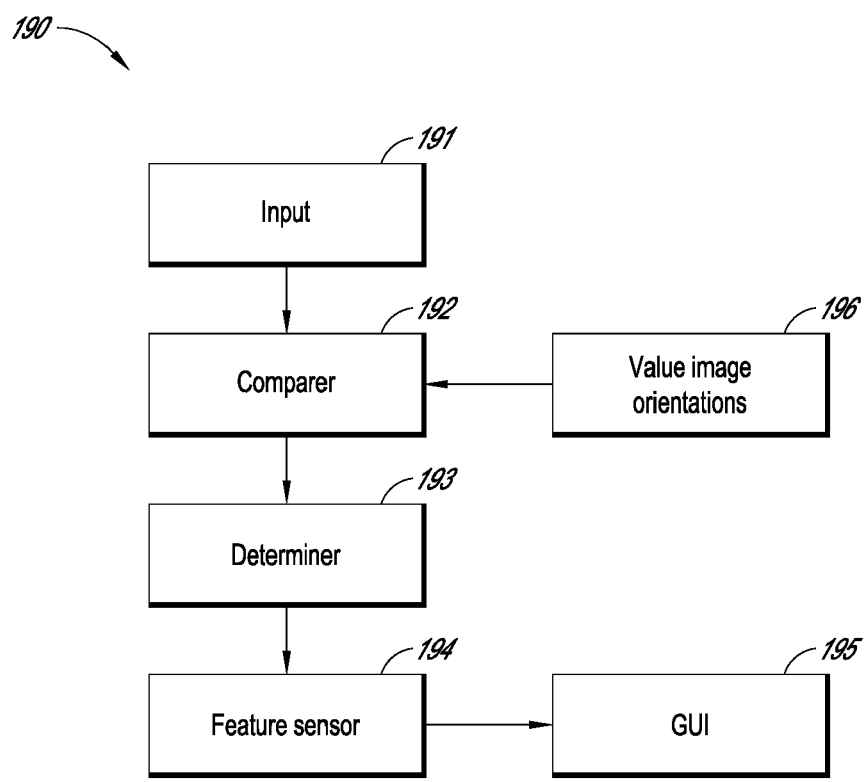
FIG. 1C is a data flow diagram of an exemplary system for sensing a feature of an object in an interactive video display system in accordance with embodiments of the present invention.

FIG. 1C is a data flow diagram of an exemplary system for sensing a feature of an object in an interactive video display system in accordance with embodiments of the present invention. System 190 includes an input 191 for receiving the vision image. In one embodiment of the invention, a vision image is split into a plurality of regions and each region is individually examined for a feature to be identified. Embodiments of the present invention search for features in a variety of orientations. For example, several rotated copies of the feature being detected are compared to different locations of the vision image.

System 190 further includes a comparer 192. The portions of the vision image are sent from the input 191 to the comparer. In one embodiment of the invention, the comparer 192 compares the portion of the vision image to a plurality of orientations of a value image 196.

A determiner 193 determines which of the plurality of orientations of the value image 196 best matches an object or feature of the portion of the vision image. Based on the match of the value image, a feature sensor 194 determines the location of the features detected by the determiner 193. The result is output to a graphical user interface 195.

Figure 2:
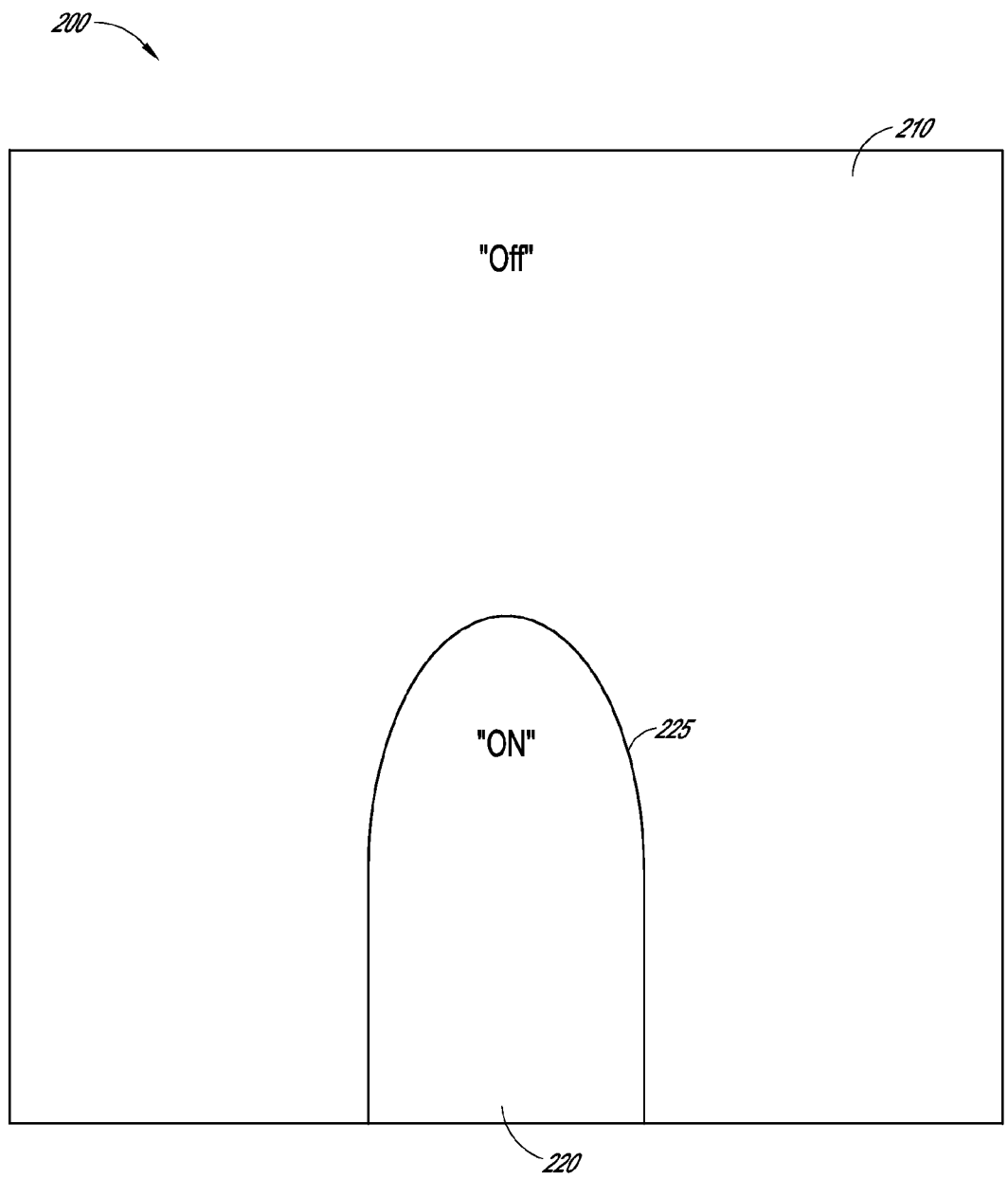
FIG. 2 is an illustration of a portion of a vision image of an interactive video display system in accordance with embodiments of the present invention.

FIG. 2 is an illustration of a portion of a vision image 200 in accordance with embodiments of the present invention. As stated above, regions of the vision image that are determined to be background 210 are assigned a value of zero (e.g., "off") and regions of the vision image that are determined to comprise foreground objects 220 of interest (e.g., people or other objects) are assigned a positive value (e.g., 225).

It is appreciated that the values of zero and 225 are arbitrary and could be any values, however, in accordance with embodiments of the invention, background areas are set to a value of zero and foreground areas are set to a positive value. It is also appreciated that background regions 210 of the vision image 200 are considered "off" regions and objects 220 in the foreground are considered "on" regions. A perimeter 225 is defined as the boundary between on region 220 and off region 210. In one embodiment of the invention, the perimeter 225 is the width of a single pixel.

Figure 3A:
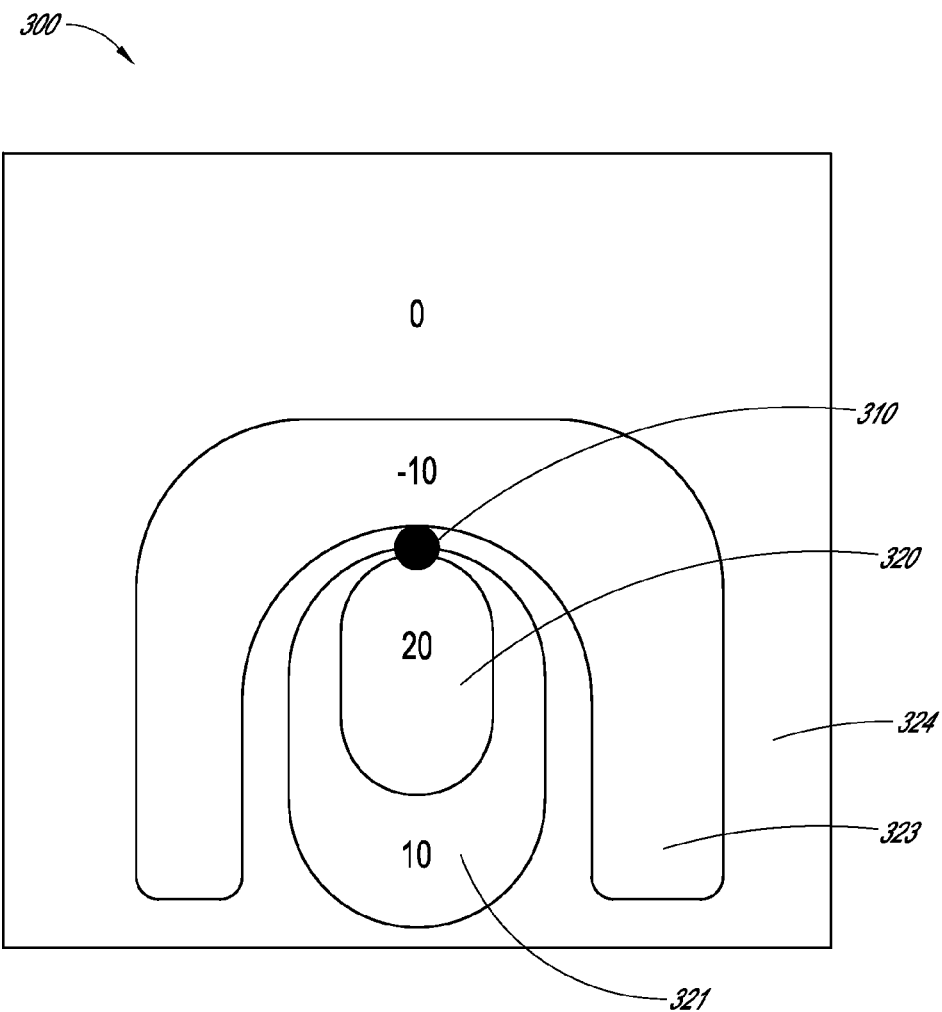
FIG. 3A is an illustration of an exemplary value image of an interactive video display system in accordance with embodiments of the present invention.

FIG. 3A is an illustration of an exemplary value image 300 e.g., bitmapped image in accordance with embodiments of the present invention. A value image 300 can be created for a desired shape or feature of an object that is to be identified from the vision image 200 of FIG. 2. Value image 300 of FIG. 3A is for a tip. The parts of the value image 300 that are most tip-like are assigned the highest weighted value. It is appreciated that a value image can be created for object attributes such as curvature of particular features, distance from a center point, etc.

In one embodiment of the invention, a tip can be the tip of a finger, the tip of a foot or the tip of any object in the vision image. It is appreciated that in most cases, a user interacts with displayed objects with the tip of an object. In most cases, the user may use the tip of a finger or the tip of a foot (or shoe) to interact with the displayed objects. However, it is appreciated that the tip could be of any object used to interact with the displayed images.

It is also appreciated that locating the tip of an object improves recognition of user gestures in which tip movement may define the gesture. For example, in the case of an interactive video game, user gestures can be used to control and interact with the video game. Improved recognition of user gestures enhances the user's experience with the interactive video game.

The value image 300 includes a plurality of regions 320, 321, 323, 324 comprising weighted values (e.g., 20, 10, 0 and −10) around a center point 310. The weighted regions of the value image that best match the desired shape (e.g., the desired shape that is being matched) have a higher value (e.g., region 320 has a value of 20) than the regions outside the desired shape (e.g., region 324 has a value of zero). In one embodiment of the invention, regions closest to the center point 310 are assigned higher weighted values. Region 323 has a value of negative ten.

In one embodiment of the invention, individual frames of the vision image are multiplied pixel by pixel by the corresponding value of the value image (for a particular orientation) and a result is determined. In one embodiment of the invention, the average value of the value image is equal to zero. In one embodiment of the invention tip-like features are identified over features that are not tip-like based on a threshold result of the multiplication. In one embodiment of the invention, if the average value of the result of the multiplication is greater than the selected threshold value, the image is determined to be a match of the value image. If the resulting value is less than the threshold value, the image is determined to not be a match of the value image (for a particular orientation).

In one embodiment of the invention, each pixel of the vision image is multiplied by the corresponding weighted value of the value image. In one embodiment of the invention, only the pixels on the perimeter of an "on" region of the vision image are multiplied by the corresponding values of the value image.

In one embodiment of the invention, at each pixel of the vision image, several different orientations of the value image are compared to the region surrounding the pixel. The "best fit" is the one with the highest value as computed by multiplying the vision image's region with the value image. If the value for the "best fit" is above the threshold value for tips, it is classified as a tip. If it is lower than the threshold value, it is not classified as a tip. In some cases, multiple tips are detected very close together (e.g., only a few pixels apart). In these cases, embodiments of the present invention may apply a tip thinning technique so that only one tip is recognized per arm or leg, for example. This can be performed many different ways. In one embodiment of the invention, tips that have another tip of a higher value (as computed by the value image multiplication) that is closer to it than a distance of N pixels are deleted.

In one embodiment of the invention, the vision image is multiplied by the value image in a plurality of orientations to determine an orientation of the value image that best matches the shape of the vision image to be identified. In one embodiment of the invention, the value image is compared to the vision image in sixteen different orientations in clockwise fashion across sixteen different rotational offsets. In one embodiment of the invention, the pixels on the perimeter of the vision image are multiplied by a plurality of orientations of the value image to determine the direction of the tip. The orientation that results in the highest value is determined to be the direction of the tip (assuming a tip exists at that location).

Figure 3B:
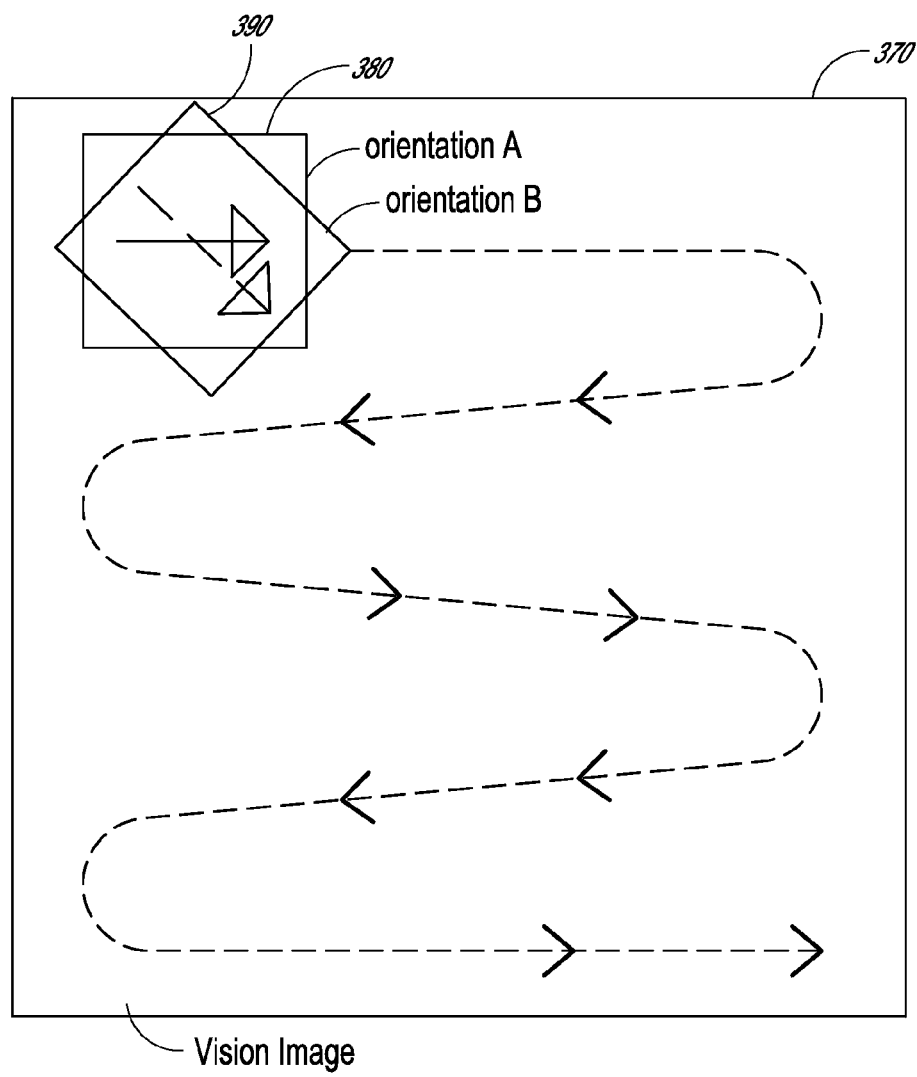
FIG. 3B is an illustration of how a value image can be scanned across a vision image of an interactive video display system in accordance with embodiments of the present invention.

FIG. 3B is an illustration of how a value image is compared to a vision image 370 in multiple orientations, orientation A 380 and orientation B 390. In one embodiment of the invention, orientation A is compared to the vision image 370 by scanning the value image back and forth across the image 370 in a plurality of orientations. In one embodiment of the invention, orientation B 390 is compared sequentially after orientation A 380 for the same portion of the vision image 370. In one embodiment of the invention, pixels on the perimeter of a foreground object are scanned and compared to multiple orientations of the value image.

It is appreciated that the way in which the value image is scanned over the vision image can be one of many methods used for comparing images well known in the art. It is also appreciated that FIG. 3B shows only two orientations of the value image and that any number of orientations of the value image can be used to sense a feature in accordance with embodiments of the present invention.

Figure 4:
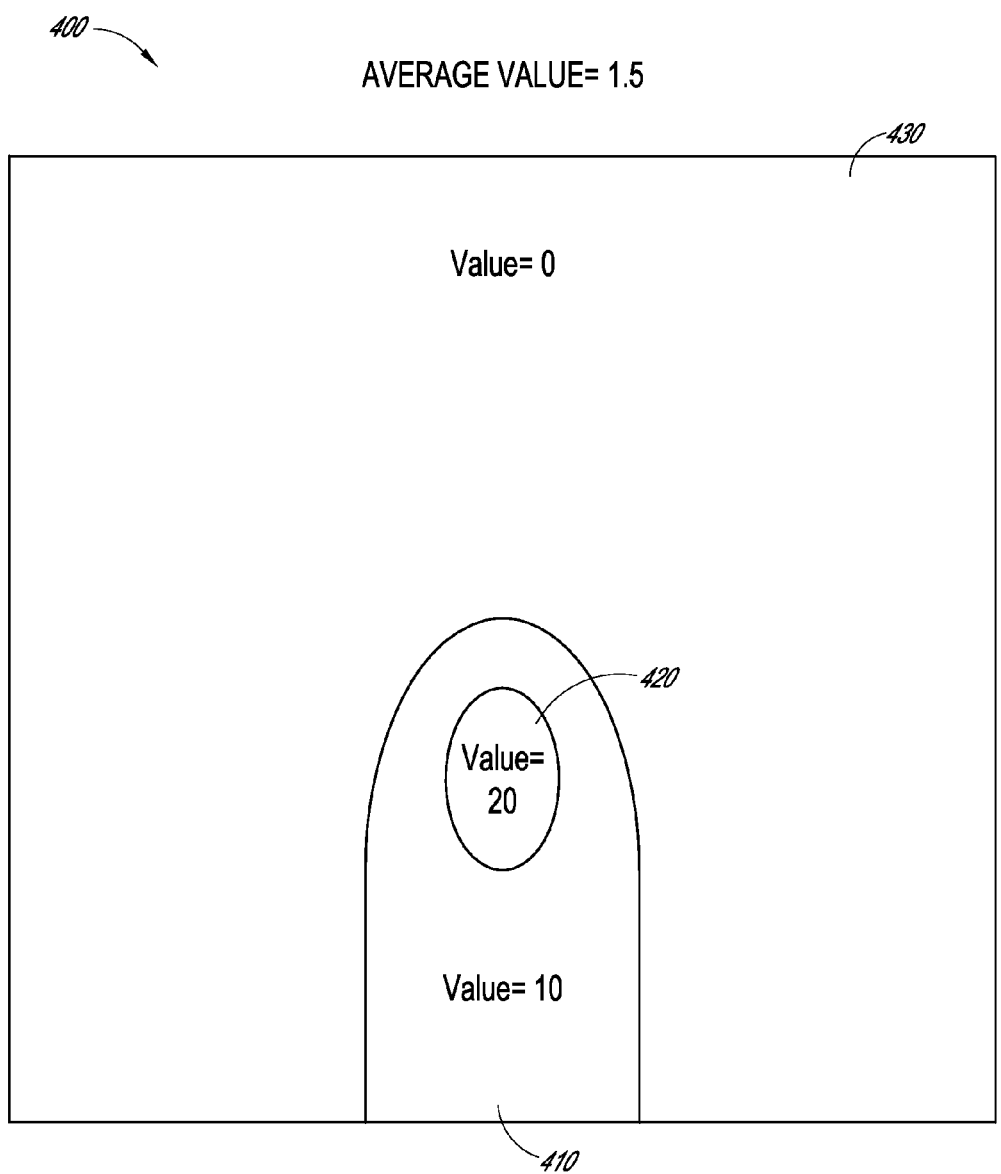
FIG. 4 is an illustration of the result of multiplying pixels of a vision image of an interactive video display system by pixels of a value image in accordance with embodiments of the present invention.

FIG. 4 is an illustration of the result 400 of multiplying the vision image 200 of FIG. 2 by the value image 300 of FIG. 3 in accordance with embodiments of the present invention. The areas of the vision image 200 that are "off" (e.g., area 210) are set to a value of zero. The areas that are "on" (e.g., area 225) are set to the corresponding weighted value of the value image. For example, region 420 of FIG. 4 has a value of twenty and region 410 has a value of ten.

As stated above, the value image can be weighted such that the average value of the value image is, for example, zero. In one embodiment of the invention, a threshold value for the result of multiplying the value image by the vision image is set (e.g., a threshold value of one). Resulting values of the multiplication that are greater than the threshold value are considered tip-like and resulting values of the multiplication that are less than the threshold value are not considered tip-like. For example, the average value of the result 400 of FIG. 4 is 1.5. In this case, assuming a threshold value of one, the result 400 is considered tip-like. However, referring now to FIG. 5B, the result 500*b* has an average value of 0.5, which is below the threshold value of one. In this case, the result 500*b* would not be considered tip-like.

Figure 5A:
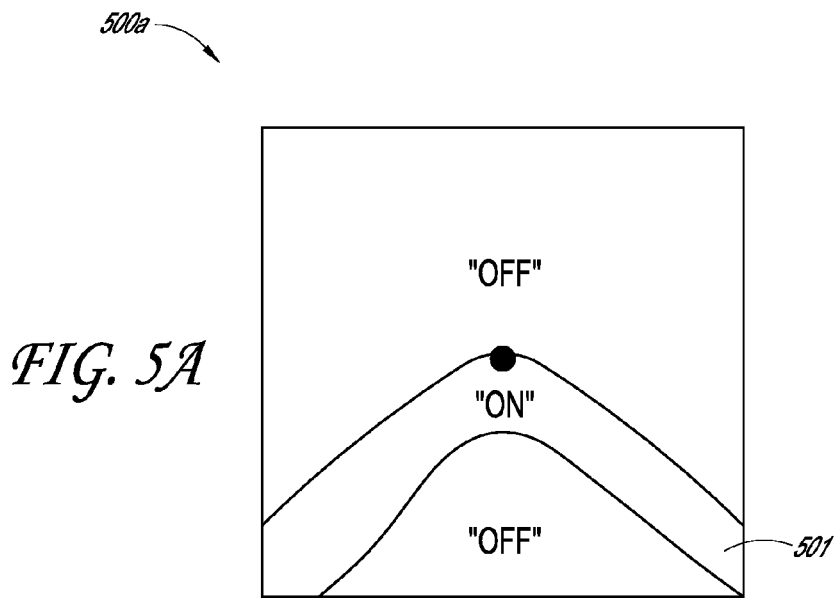
FIG. 5A is an illustration of a vision image of an elbow in an interactive video display system in accordance with embodiments of the present invention.
Figure 5B:
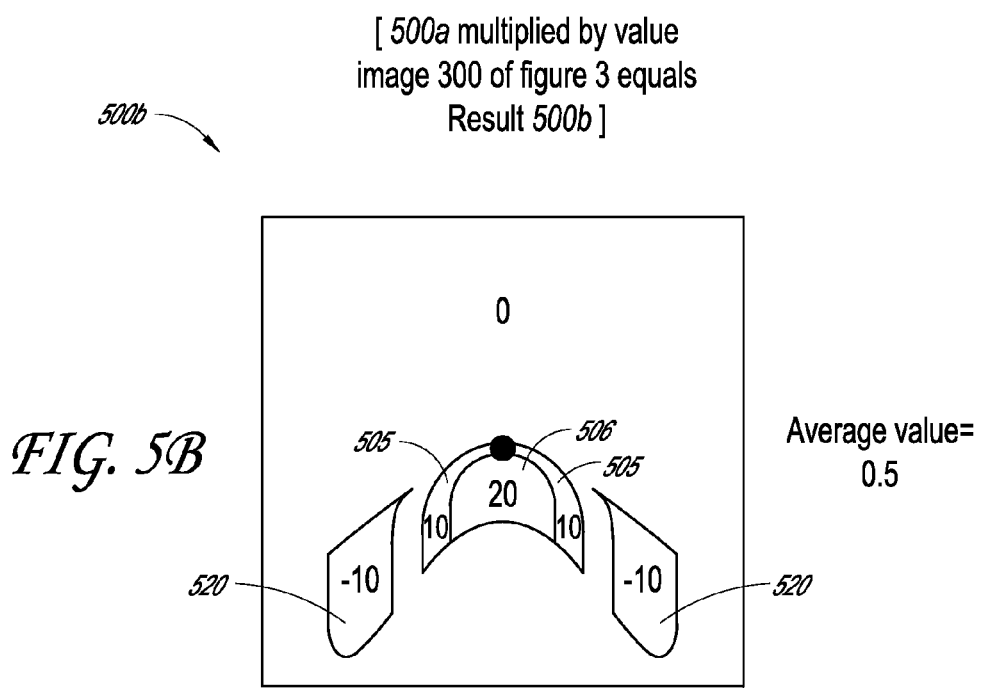
FIG. 5B is an illustration of the result of multiplying the vision image of an elbow in an interactive video display system by a value image for a tip of a finger in accordance with embodiments of the present invention.

FIG. 5A is an illustration of a vision image 500a of an elbow 501. FIG. 5B is an illustration of the result 500b of multiplying the vision image 500a of the elbow 501 by the value image 300 of FIG. 3. The result 500b comprises a large area 520 that has a negative value and regions 505 and 506 that comprise positive values. The large region with a negative value lowers the average value and the result 500b. As a result, the average value of the result 500b is lower than the threshold value of one and the image is determined to not be tip-like.

In one embodiment of the invention, only the pixels on the perimeter of a foreground area are considered. In this embodiment of the invention, each pixel of the perimeter is compared to a plurality of orientations of the value image. The most positive result is assigned to the pixel and the pixel on the perimeter with the highest value is considered the tip (assuming this value exceeds the threshold value, e.g., threshold value of 0.5).

Figure 6:
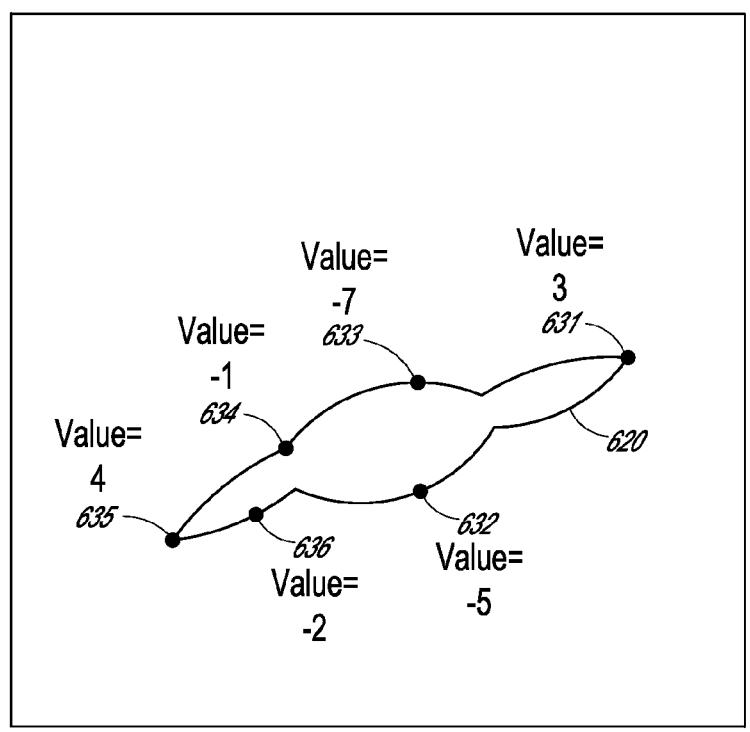
FIG. 6 is an illustration of a foreground object perimeter of a vision image of an interactive video display system in accordance with embodiments of the present invention.

FIG. 6 is an illustration of a foreground object perimeter 620 of a value image 600 in accordance with embodiments of the present invention. The pixels on the perimeter 620 have been evaluated by a plurality of orientations of a value image. In this example, the highest resulting value is assigned to each pixel. For clarity only a few of many values are illustrated. Pixel 631 has a value of three, pixel 632 has a value of negative five, pixel 633 has a value of negative seven, pixel 634 has a value of negative one, pixel 635 has a value of four and pixel 636 has a value of negative two.

Multiple tips may be chosen for a single foreground area if they are far enough away from each other. Or, no tips may be chosen. In FIG. 6, both pixel 631 and pixel 635 may be chosen as tips because they exceed the threshold value of zero.

In one embodiment of the invention, locating a tip of an object improves user interaction with the interactive video display system. For example, determining a tip of an object improves recognizing user gestures. This becomes important in interactive games. Recognized user gestures can be used as user input for controlling an interactive game. A movement path of the tip of an object can define a gesture. In one embodiment of the invention, a user tip is interactive with a button, icon or other menu items displayed by the interactive video display system.

It is appreciated that embodiments of the present invention can be used for identifying salient features of an interactive video projection system. For example, assume an interactive baseball game wherein a user physically holds a baseball and makes motions with the baseball to interact with projected images. Embodiments of the present invention can determine the position and orientation of the baseball to improve the user experience with the interactive game. In this embodiment of the invention, the value image comprises weighted regions that facilitate recognition of a baseball rather than a tip.

In another embodiment embodiments of the present invention can be used to make a gesture game in which the player can make different types of gestures (e.g., a pointing index finger, an "ok" sign, cupping hands together to form a "C", crossing arms to form an "X," etc.) to affect the game state. For example, the user could be in a fighting game where they make one gesture to shoot and another to block.

In another embodiment of the invention, persistent attributes of a foreground image are used to identify features. For example, specific curvatures (e.g., small radius curves) of objects can indicate a tip. In another embodiment of the invention, the point furthest from a center point of an object is determined to be the tip of the object. In this embodiment of the invention, the end of an extended leg or arm is determined to be the tip.

Figure 7:
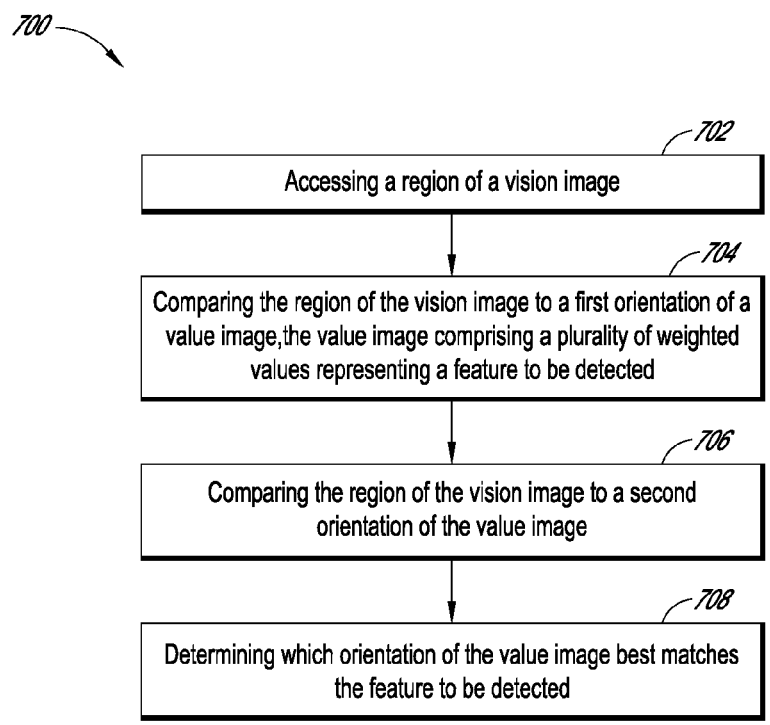
FIG. 7 is a flow diagram of an exemplary computer controlled method for processing vision image information in an interactive video display system in accordance with embodiments of the present invention.

FIG. 7 is a flow diagram of an exemplary computer controlled method 700 for processing vision image information in an interactive video display system in accordance with embodiments of the present invention.

At step 702, method 700 includes accessing a region of a vision image, e.g., digital image. In one embodiment of the invention, the vision image comprises background regions and foreground regions. In one embodiment of the invention, the foreground regions comprise a user of an interactive video display system.

At step 704, method 700 includes comparing a portion of the region of the vision image to a first orientation of a value image, wherein the value image comprises a plurality of weighted values representing a feature to be detected. In one embodiment of the invention, the value image represents a feature used to interact with the interactive video display system. For example, the value image can represent human features such as a tip of a finger, a tip of a foot or shoe or the value image can represent other objects such as a baseball, hokey stick, fishing rod or any other object used to interact with displayed objects of the interactive video display system.

In one embodiment of the invention, only pixels on a perimeter of a foreground object are examined. In this embodiment of the invention, zero or more pixels on the perimeter may be considered tip-like.

At step 706, method 700 includes comparing the portion of the vision image to a second orientation of the value image. In one embodiment of the invention, the direction of the tip is determined. In one embodiment of the invention, multiple orientations of the value image are compared to the portion of the vision image and the orientation that results in the highest value is used to determine the direction of the tip. Other techniques may be used, for example, multiple orientations with high values may be averaged.

At step 708, method 700 includes determining which orientation of the value image best matches said feature to be detected. The value image orientation that has the highest average resulting value when the value image and vision image are multiplied together is considered the most tip-like direction. The above is repeated for multiple different portions of the image in order to locate the best match.

Figure 8:
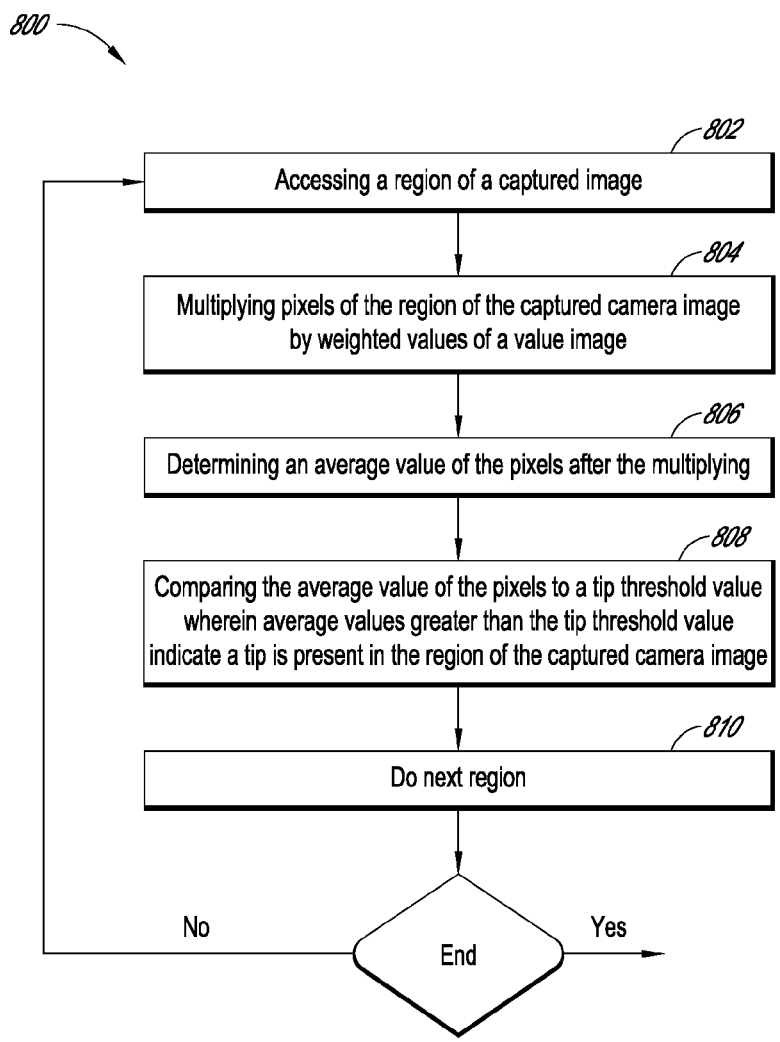
FIG. 8 is a flow diagram of an exemplary computer controlled method for sensing a feature of an object in an interactive video display system in accordance with embodiments of the present invention.

FIG. 8 is a flow diagram of an exemplary method for sensing a feature of an object in an interactive video display system in accordance with embodiments of the present invention. In one embodiment of the invention, the feature is a tip.

At step 802, method 800 includes accessing a region of a vision image. In one embodiment of the invention, background regions of the vision image are considered "off" regions and foreground objects of the vision image are considered "on" regions. In one embodiment of the invention, on regions are assigned a higher value than off regions for purposes of detecting features in accordance with embodiments of the present invention.

At step 804, method 800 includes multiplying pixels of the region of the vision image by weighted values of a value image. In one embodiment of the invention, all pixels in the "on" regions are evaluated. In other embodiments of the invention, a subset, random or ordered, of the pixels in the "on" regions are evaluated. In another embodiment of the invention, only pixels on a perimeter of the "on" region are evaluated.

At step 806, method 800 includes determining an average value of the pixels after the multiplying of step 804. In one embodiment of the invention, the average value of the pixels is used to determine how well the region matches the value image.

At step 808, method 800 includes comparing the average value of the pixels to a feature threshold value wherein average values greater than the feature threshold value indicate a match between the region of the vision image and the value image.

At step 810, method 800 includes doing the next region. In one embodiment of the invention, the entire vision image is scanned in a fashion described in conjunction with FIG. 3B.

Figure 9:
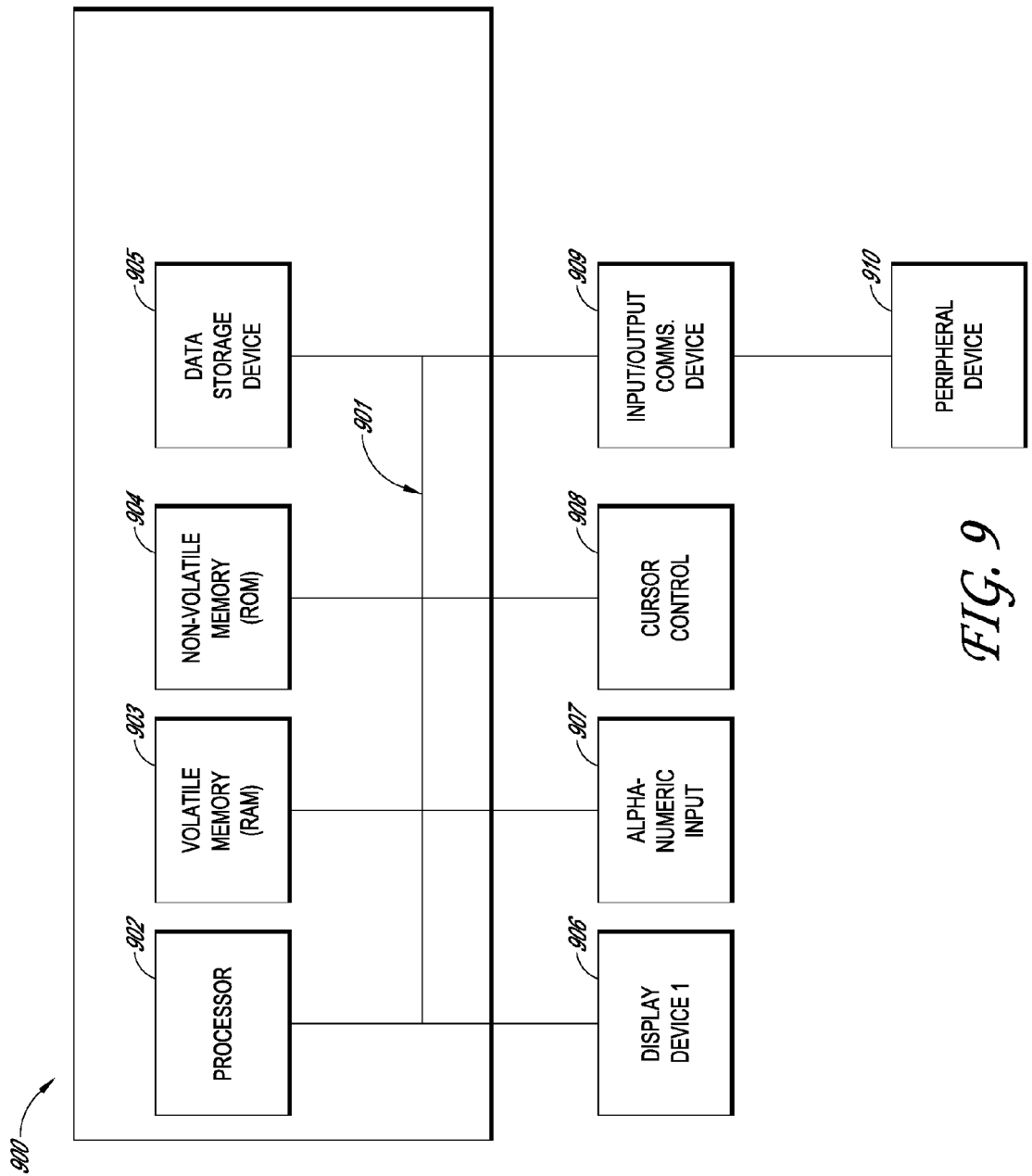
FIG. 9 is a block diagram of exemplary computer system in accordance with embodiments of the present invention.

Referring now to FIG. 9, a block diagram of exemplary computer system 900 is shown. It is appreciated that computer system 900 of FIG. 9 described herein illustrates an exemplary configuration of an operational platform upon which embodiments of the present invention can be implemented. Nevertheless, other computer systems with differing configurations can also be used in place of computer system 900 within the scope of the present invention. For example, computer system 900 could be a server system, the client system, a node on a network, a personal computer, a game console or an embedded computer system. Furthermore, computer system 900 could be a multiprocessor computer system.

Computer system 900 includes an address/data bus 901 for communicating information, a central processor 902 coupled with bus 901 for processing information and instructions, a volatile memory unit 903 (e.g., random access memory, static RAM, dynamic RAM, etc.) coupled with bus 901 for storing information and instructions for central processor 902 and a non-volatile memory unit 904 (e.g., read only memory, programmable ROM, flash memory, EPROM, EEPROM, etc.) coupled with bus 901 for storing static information and instructions for processor 902. Computer system 900 may also contain a display device 906 coupled to bus 901 for displaying information to the computer user. In one embodiment of the invention, display device 906 is a video display projector. Moreover, computer system 900 also includes a data storage device 905 (e.g., disk drive) for storing information and instructions.

Also included in computer system 900 of FIG. 9 is an optional alphanumeric input device 907. Device 907 can communicate information and command selections to central processor 902. Computer system 900 also includes an optional cursor control or directing device 908 coupled to bus 901 for communicating user input information and command selections to central processor 902. Computer system 900 also includes signal communication interface 909, which is also coupled to bus 901, and can be a serial port. Communication interface 909 can also include number of wireless communication mechanisms such as infrared or a Bluetooth protocol.

Embodiments of the present invention, a system and method for sensing a feature of an object in an interactive video display system have been described. While the present invention has been described in particular embodiments, it should be appreciated that the present invention should not be construed as limited by such embodiments, but rather construed according to the following Claims.

What is claimed is:

1. A method of determining an angular position of a human finger depicted in a captured image, wherein the method is configured for execution by a computing system comprising one or more computing devices, the method comprising:

accessing, by a, computing system, a first portion of a captured image, wherein the captured image comprises at least an image of a human finger;

comparing, by the computing system, the first portion of the captured image to a value image at each of a plurality of angular positions of the value image, wherein the value image comprises a plurality of regions each associated with a respective weighted value and wherein a region of the value image associated with a region of interest of the human finger is assigned a higher weighted value than other regions of the value image;

calculating, by the computing system, respective match values for each of the plurality of angular positions of the value image by multiplying pixels of the captured image and corresponding weighted values of the angular positions of the value image; and selecting as an angular position of the image of the human finger in the captured image the angular position of the value image associated with a highest match value.

2. The method as described in claim 1, further comprising:
consecutively accessing by the computing system each of a plurality of portions of the captured image;
comparing by the computing system the plurality of portions of the captured image to each of the plurality of angular positions of the value image;
calculating by the computing system respective match values for each region of the value image for each of the plurality of angular positions of the value image; and
selecting a portion of the captured image as comprising the image of the human finger based on the calculated match values.

3. The method of claim 2, further comprising selecting as an angular position of the image of the human finger the angular position associated with the angular position of the value image associated with a highest match value.

4. The method of claim 1 wherein the captured image is a frame of a video image.

5. A computing system for processing image information, the system comprising:
a device configured to access at least a portion of an input image;
a comparer configured to:
select a pixel within the portion of the input image;
access a value image representative of a feature to be identified within the input image, wherein the value image comprises a plurality of regions each having a weighted value and wherein regions of the value image that are positioned closest to a primary portion of the feature to be identified are assigned higher weighted values; and
compare a plurality of rotational orientations of the value image to a selected area around and including the selected pixel; and
a determiner configured to determine which of the plurality of rotational orientations of the value image best matches the area around and including the selected pixel based on the comparisons performed by the comparer.

6. The computing system of claim 5, wherein the comparer is further configured to multiply respective values associated with pixels of the input image with the weighted values of the regions of respective rotational orientations of the value image and then to sum resulting products in order to generate image values for each respective rotational orientation of the value image.

7. The computing system of claim 6, wherein the determiner determines which of the plurality of rotational orientations of the value image best matches the portion of the input image based on which of the rotational orientations of the value image has a highest image value.

8. A method comprising:
comparing, by a computing system, at least a portion of an image depicting an object to different rotations of a template image representative of rotations of the object, wherein the template image comprises a plurality of regions each having a weighted value and wherein regions of the template image that are positioned closest to a primary portion of the object depicted in the image are assigned higher weighted values;
determining, by the computing system, a match score for each of the rotations of the template image by multiplying pixels of the portion of the image and corresponding weighted values of respective rotations of the template images;
determining a rotation of the template image having a highest match score; and
determining a rotational position of the object depicted in the image to be substantially a rotational position associated with the determined rotation of the template image having a highest match score.

9. The method of claim 8, wherein the object comprises a human finger, arm, leg, toe, elbow, or head.

10. The method of claim 8, wherein the object comprises an inanimate object, a baseball, a hockey stick, a ball, a fishing rod, or an object used to interact with a displayed object of an interactive display system.

11. The method of claim 8, wherein the method comprises:
determining a highest match score for each portion of the image; and
determining which portion of the image has a highest match score in order to determine which portion of the image most likely includes the object.

12. A non-transitory computer readable medium storing software instructions that are readable by a computing system, wherein the software instructions are executable on the computing system in order to cause the computing system to perform operations comprising:
accessing an image depicting an object;
comparing at least a portion of the image to two or more orientations of a value image representative of the object, wherein the value image comprises a plurality of regions each having a weighted value and wherein one or more regions of the value image that are nearest to a portion of interest of the object depicted in the image are assigned higher weighted values than other regions of the value image;
determining a match score for each of the orientations of the value image by multiplying pixels of the image with respective weighted values of the regions of the value image at different orientations;
determining an orientation of the value image having a highest match score to the portion of the image; and
determining an orientation of the object deplected in the image to be substantially the determined orientation of the value image having the highest match score.

* * * * *

UNITED STATES PATENT AND TRADEMARK OFFICE
CERTIFICATE OF CORRECTION

PATENT NO. : 8,081,822 B1
APPLICATION NO. : 11/142202
DATED : December 20, 2011
INVENTOR(S) : Bell It is certified that error appears in the above-identified patent and that said Letters Patent is hereby corrected as shown below:

Title Page 3, in Field (56), under "OTHER PUBLICATIONS", in Column 2, Line 9, delete "/hmtl/rl11" and insert -- /html/r111--, therefor.

Title Page 4, in Field (56), under "OTHER PUBLICATIONS", in Column 1, Line 38, delete "Recogniton," and insert -- Recognition, --, therefor.

Title Page 4, in Field (56), under "OTHER PUBLICATIONS", in Column 2, Line 39, delete "Computig" and insert -- Computing --, therefor.

Title Page 4, in Field (56), under "OTHER PUBLICATIONS", in Column 2, Line 44, delete ".corn>" and insert -- .com> --, therefor.

Title Page 5, in Field (56), under "OTHER PUBLICATIONS", in Column 1, Line 5, delete ".corn/" and insert -- .com/ --, therefor.

In Column 10, Line 23, delete "hokey" and insert -- hockey --, therefor.

In Column 12, Line 55, in Claim 5, delete "on the" and insert -- on --, therefor.

Signed and Sealed this
Tenth Day of July, 2012

David J. Kappos
*Director of the United States Patent and Trademark Office*